(12) United States Patent
Koo

(10) Patent No.: US 7,918,615 B2
(45) Date of Patent: Apr. 5, 2011

(54) APERTURE-RING-AND-SHUTTER DEVICE

(75) Inventor: Ting-Yi Koo, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 4 days.

(21) Appl. No.: 12/534,210

(22) Filed: Aug. 3, 2009

(65) Prior Publication Data

US 2010/0272429 A1    Oct. 28, 2010

(30) Foreign Application Priority Data

Apr. 28, 2009  (TW) ................. 98114021 A

(51) Int. Cl.
*G03B 9/08*       (2006.01)
(52) U.S. Cl. ........................................ 396/449
(58) Field of Classification Search .......... 396/449–451, 396/458–461, 505–510
See application file for complete search history.

(56) References Cited

U.S. PATENT DOCUMENTS

| | | | | |
|---|---|---|---|---|
| 6,585,429 B2* | 7/2003 | Yaginuma et al. | ............ | 396/458 |
| 6,903,777 B1* | 6/2005 | Arisaka | ............ | 348/362 |
| 7,338,221 B2* | 3/2008 | Oishi et al. | ............ | 396/458 |
| 7,410,310 B2* | 8/2008 | Kihara | ............ | 396/463 |
| 7,658,558 B2* | 2/2010 | Kawamoto et al. | ............ | 396/458 |
| 2009/0052886 A1* | 2/2009 | Watanabe et al. | ............ | 396/486 |

FOREIGN PATENT DOCUMENTS

TW              200611069        4/2006

OTHER PUBLICATIONS

English abstract of TW200611069, published on Apr. 1, 2006.

* cited by examiner

*Primary Examiner* — W. B. Perkey
*Assistant Examiner* — Dennis Hancock
(74) *Attorney, Agent, or Firm* — Thomas Kayden

(57) ABSTRACT

An aperture-ring-and-shutter device includes a base unit, a shutter unit, and a diaphragm unit. The base unit includes a base having an optical opening along an optical axis. The shutter unit includes a shutter sheet, a shutter-driving element disposed on the base, and a toggling element actuated by the shutter-driving element. The toggling element has a guide bar utilized to rotate the shutter sheet. The shutter-driving element switches the toggling element between an opening location and a covering location. The guide bar of the toggling element forces the shutter sheet to expose or cover the optical opening of the base unit. The diaphragm unit includes an aperture plate, a diaphragm-driving element, and a toggled element pushed by the diaphragm-driving element. The aperture plate has an aperture less than the optical opening of the base unit. The toggled element has a guide pin utilized to rotate the aperture plate.

21 Claims, 21 Drawing Sheets

APERTURE-RING-AND-SHUTTER DEVICE

CROSS REFERENCE TO RELATED APPLICATIONS

This Application claims priority of Taiwan Patent Application No. 098114021, filed on Apr. 28, 2009, the entirety of which is incorporated by reference herein.

BACKGROUND OF THE INVENTION

1. Field of the Invention

The invention relates to a photographic device, and more particularly to an aperture-ring-and-shutter device.

2. Description of the Related Art

Generally, a photographic exposure is controlled by adjusting the aperture ring or the time period for opening/closing the shutter of a photographic device.

FIG. 1 depicts a miniaturized lens set 4 of Taiwan Patent No. I237158, wherein a first driving element 41 and a second driving element 42, with an electric current applied therethrough, can be rotated normally or reversely, dependant upon the direction of the electric current. Thus, the first driving element 41 is capable of forcing a small aperture 43 and a large aperture 44 apart or in superposition, and the second driving element 42 is capable of forcing a shutter sheet 45 to cover or expose a large aperture 44, thereby controlling light entering the miniaturized lens set 4.

As described, the rotational direction of the first driving element 41 and the second driving element 42 is determined by the direction of the electric current applied therethrough, thereby controlling light entering the miniaturized lens set 4. However, this arrangement requires frequent electric current direction changes. Thus, power management is complex. Furthermore, the first driving element 41 and the second driving element 42 are used for moving the shutter sheet 45 and the small aperture 43. Therefore, an increased number of aperture rings requires an increased number of driving elements. As a result, volume and the manufacturing cost of the miniaturized lens set 4 are correspondingly increased.

BRIEF SUMMARY OF THE INVENTION

An object of the invention is to provide an aperture-ring-and-shutter device having simple power management.

Another object of the invention is to provide an aperture-ring-and-shutter device having reduced volume and manufacturing cost.

The aperture-ring-and-shutter device in accordance with an exemplary embodiment of the invention includes a base unit, a shutter unit, and a diaphragm unit. The base unit includes a base which has a first surface, a second surface opposing the first surface, and an optical opening penetrating through the first and second surfaces along an optical axis. The shutter unit includes at least one shutter sheet, a shutter-driving element disposed on the base, and a toggling element actuated by the shutter-driving element, wherein the toggling element has a guide bar utilized to rotate the at least one shutter sheet, and the shutter-driving element switches the toggling element between an opening location and a covering location, and the guide bar of the toggling element forces the at least one shutter sheet to expose or cover the optical opening of the base. The diaphragm unit includes a first aperture plate, a diaphragm-driving element disposed on the base, and a toggled element pushed by the diaphragm-driving element, wherein the first aperture plate has a first aperture less than the optical opening of the base, and the toggled element has a guide pin utilized to rotate the first aperture plate. The diaphragm-driving element drives the toggled element from a first aperture location to a large aperture location, and the guide pin of the toggled element rotates the first aperture plate, so that the first aperture of the first aperture plate and the optical opening of the base in superposition are switched to separate from each other. The toggled element is switched to the first aperture location when the toggled element is located at the large aperture location and the toggling element is switched from the opening location to the covering location.

The power management of the shutter-driving element and the diaphragm-driving element is simplified by switching the toggled element from the large aperture location to the first aperture location when the toggling element of the shutter unit is switched from the opening location to the covering location.

The aperture-ring-and-shutter device in accordance with another exemplary embodiment of the invention includes a base unit, a shutter unit and a diaphragm unit. The base unit comprises a base comprising a first surface, a second surface opposing the first surface, and an optical opening penetrating through the first surface and the second surface along an optical axis. The shutter unit comprises at least one shutter sheet pivotally disposed on the base of the base unit, a shutter-driving element disposed on the base of the base unit, and a toggling element actuated by the shutter-driving element. The at least one shutter sheet comprises an arm, the toggling element has a guide bar utilized to rotate the at least one shutter sheet, and the shutter-driving element switches the toggling element between an opening location and a covering location, so that the guide bar of the toggling element forces the at least one shutter sheet to expose or cover the optical opening of the base unit. The diaphragm unit comprises a first aperture plate, a diaphragm-driving element disposed on the base of the base unit, and a toggled element pushed by the diaphragm-driving element, wherein the first aperture plate has a first aperture less than the optical opening of the base unit, and the toggled element has a guide pin utilized to rotate the first aperture plate. The diaphragm-driving element drives the toggled element from a first aperture location to a large aperture location, and the guide pin of the toggled element rotates the first aperture plate, so that the first aperture of the first aperture plate and the optical opening of the base unit in superposition are switched to separate from each other. The toggled element is switched to the first aperture location by the arm of the at least one shutter sheet when the toggled element is located at the large aperture location and the toggling element is switched from the opening location to the covering location.

The power management of the shutter-driving element and the diaphragm-driving element can be simplified by switching the toggled element from the large aperture location to the first aperture location when the arm of the shutter sheet of the shutter unit is switched from the opening location to the covering location.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is noted that in the following descriptions the same references are used for elements which are identical or similar to each other.

Figure 1:
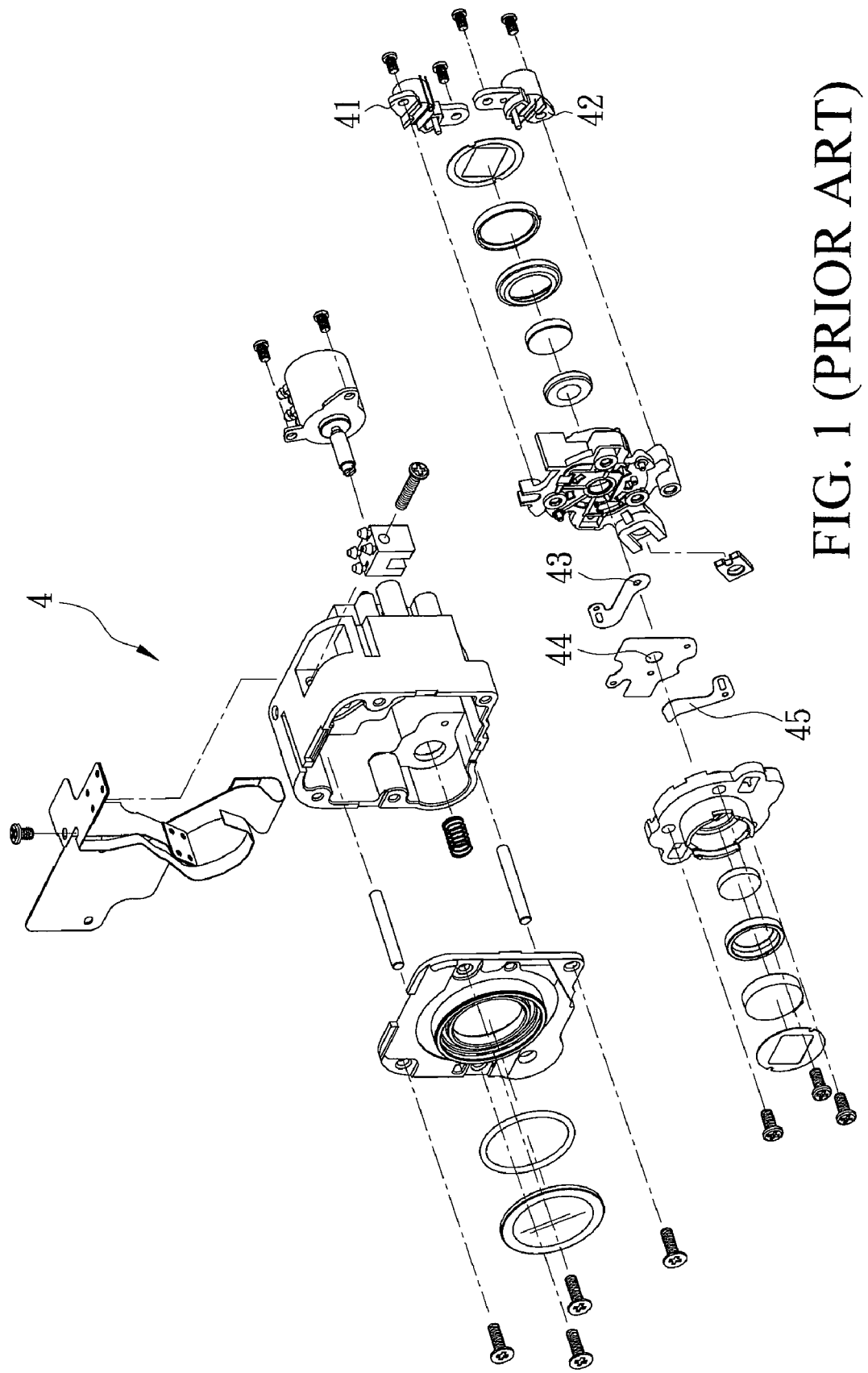
FIG. 1 is an exploded perspective diagram showing a miniaturized lens set of Taiwan Patent No. I237158.
Figure 2:
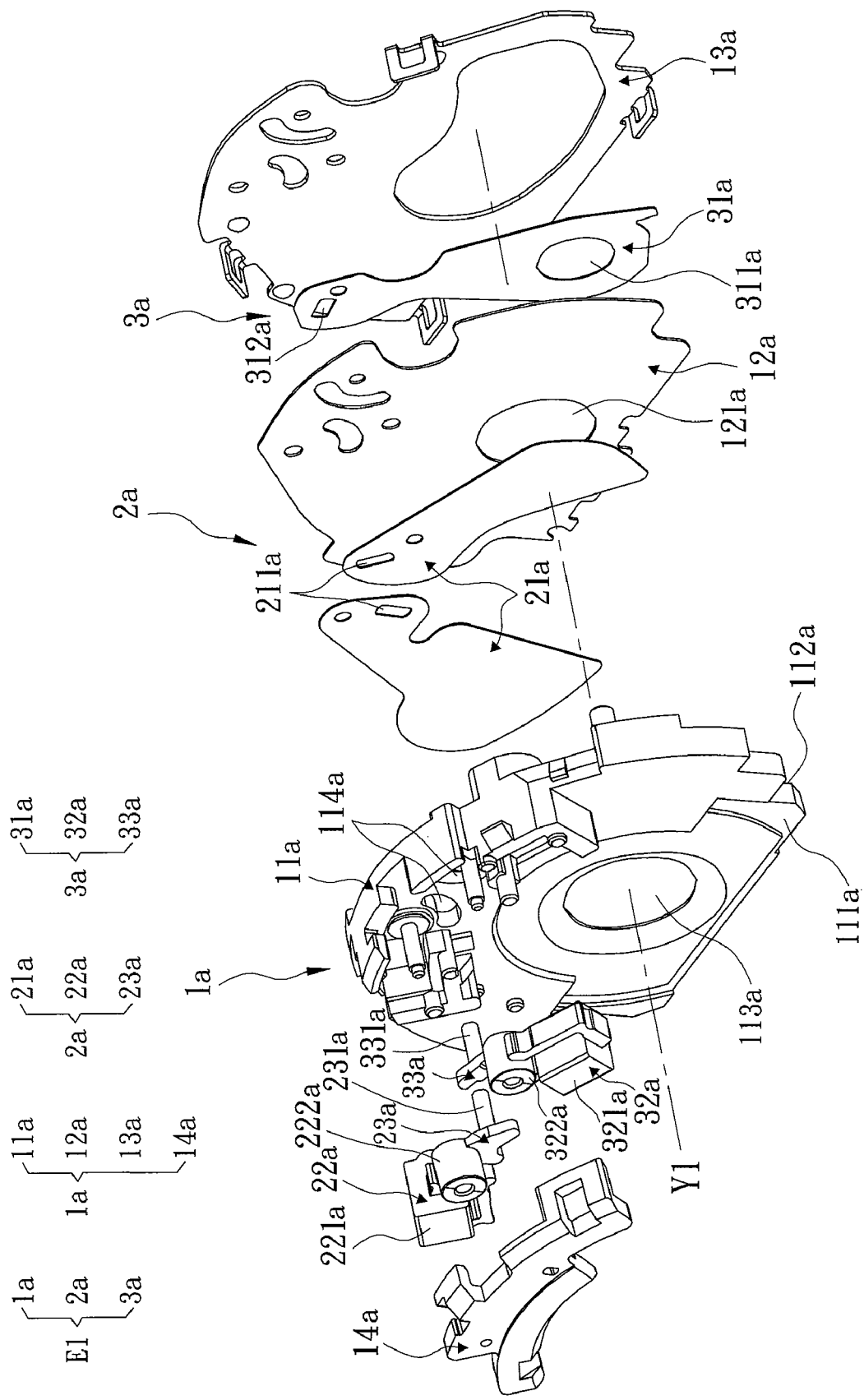
FIG. 2 is an exploded perspective diagram showing an aperture-ring-and-shutter device in accordance with a first embodiment of the invention.
Figure 3:
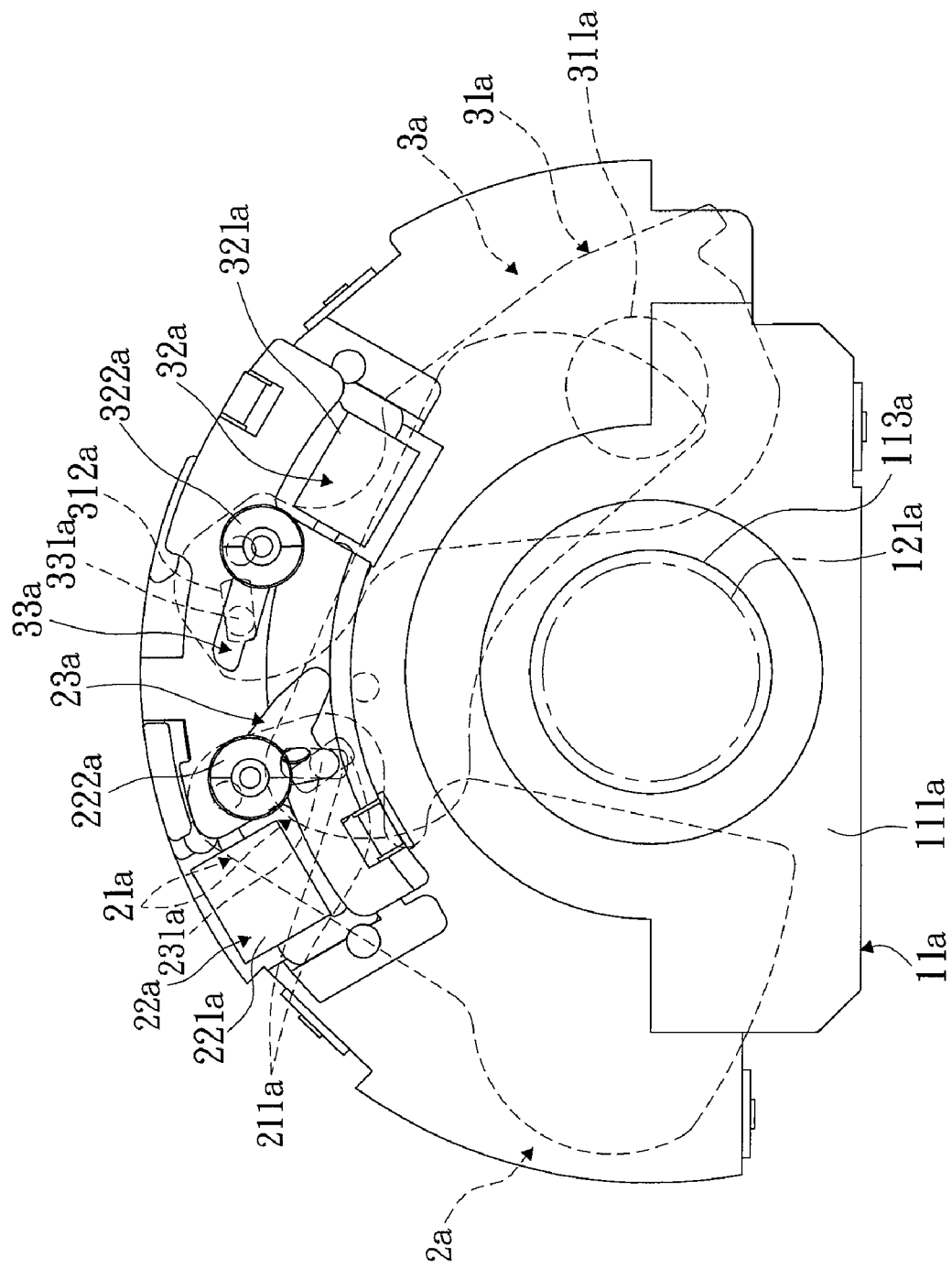
FIG. 3 is a top view showing the locations of two shutter sheets and a first aperture plate when a toggling element and a toggled element are respectively at an opening location and a large aperture location.

Referring to FIGS. 2 and 3, an aperture-ring-and-shutter device E1 of a first embodiment includes a base unit 1a, a shutter unit 2a, and a diaphragm unit 3a.

The base unit 1a includes a base 11a, a large aperture plate 12a, a primary pressure/cover plate 13a fastened to the base 11a, and a secondary pressure/cover plate 14a also fastened to the base 11a. The base 11a has a first surface 111a, a second surface 112a opposing the first surface 111a, an optical opening 113a penetrating through the first surface 111a and the second surface 112a along an optical axis Y1, and two curved slots 114a penetrating through the first and second surfaces 111a and 112a along the optical axis Y1. The large aperture plate 12a disposed adjacent to the second surface 112a of the base 11a is provided with a large aperture 121a which is less than the optical opening 113a of the base 11a. Furthermore, the large aperture 121a of the large aperture plate 12a and the optical opening 113a of the base 11a are disposed in superposition.

The shutter unit 2a includes two shutter sheets 21a pivoted to the base 11a, a shutter-driving element 22a disposed on the first surface 111a, and a toggling element 23a driven by the shutter-driving element 22a. Each of the shutter sheets 21a, disposed between the base 11a and the large aperture plate 12a, has an elongated hole 211a. The shutter-driving element 22a has a first electromagnetic actuator 221a and a first magnetic element 222a pivoted to the base 11a of the base unit 1a and firmly connected to the toggling element 23a. The first magnetic element 222a is driven by the first electromagnetic actuator 221a to spin about its own axis. In this embodiment, the first electromagnetic actuator 221a is an electromagnet and the first magnetic element 222a is a magnet. The toggling element 23a has a guide bar 231a passing through one of the curved slots 114a of the base 11a of the base unit 1a and the elongated holes 211a of the shutter sheets 21a for rotating the shutter sheets 21a. The shutter-driving element 22a is capable of switching the toggling element 23a between an opening location (shown in FIGS. 3 and 5) and a covering location (shown in FIG. 4), so that the guide bar 231a of the toggling element 23a can force the shutter sheets 21a to expose or cover the optical opening 113a of the base 11a of the base unit 1a.

The diaphragm unit 3a includes a first aperture plate 31a pivoted to the base 11a, a diaphragm-driving element 32a disposed on the first surface 111a, and a toggled element 33a driven by the diaphragm-driving element 32a. The first aperture plate 31a has an elongated hole 312a and a first aperture 311a which is less than the optical opening 113a of the base 11a and the large aperture 121a of the large aperture plate 12a. The diaphragm-driving element 32a includes a second electromagnetic actuator 321a and a second magnetic element 322a pivoted to the base 11a of the base unit 1a and firmly connected to the toggled element 33a. The second magnetic element 322a is driven by the second electromagnetic actuator 321a to spin about its own axis. In this embodiment, the second electromagnetic actuator 321a is an electromagnet and the second magnetic element 322a is a magnet. The toggled element 33a has a guide pin 331a passing through the other curved slot 114a of the base 11a of the base unit 1a and the elongated holes 312a of the first aperture plate 31a for rotating the first aperture plate 31a. The shutter-driving element 32a is capable of switching the toggled element 33a between a first aperture location (shown in FIGS. 4 and 5) and a large aperture location (shown in FIG. 3), so that the guide pin 331a of the toggled element 33a can rotate the first aperture plate 31a and force the first aperture 311a of the first aperture plate 31a and the optical opening 113a of the base 11a of the base unit 1a in superposition or apart.

When the shutter unit 2a, the diaphragm unit 3a, and the base unit 1a are assembled, the shutter sheet 21a, the large aperture plate 12a, and the first aperture plate 31a are connected to the base 11a by fastening the primary pressure/cover plate 13a and the base 11a, and the shutter-driving element 22a, the diaphragm-driving element 32a, the toggling element 23a, and the toggled element 33a are connected to the base 11a by fastening the secondary pressure/cover plate 14a and the base 11a.

Figure 4:
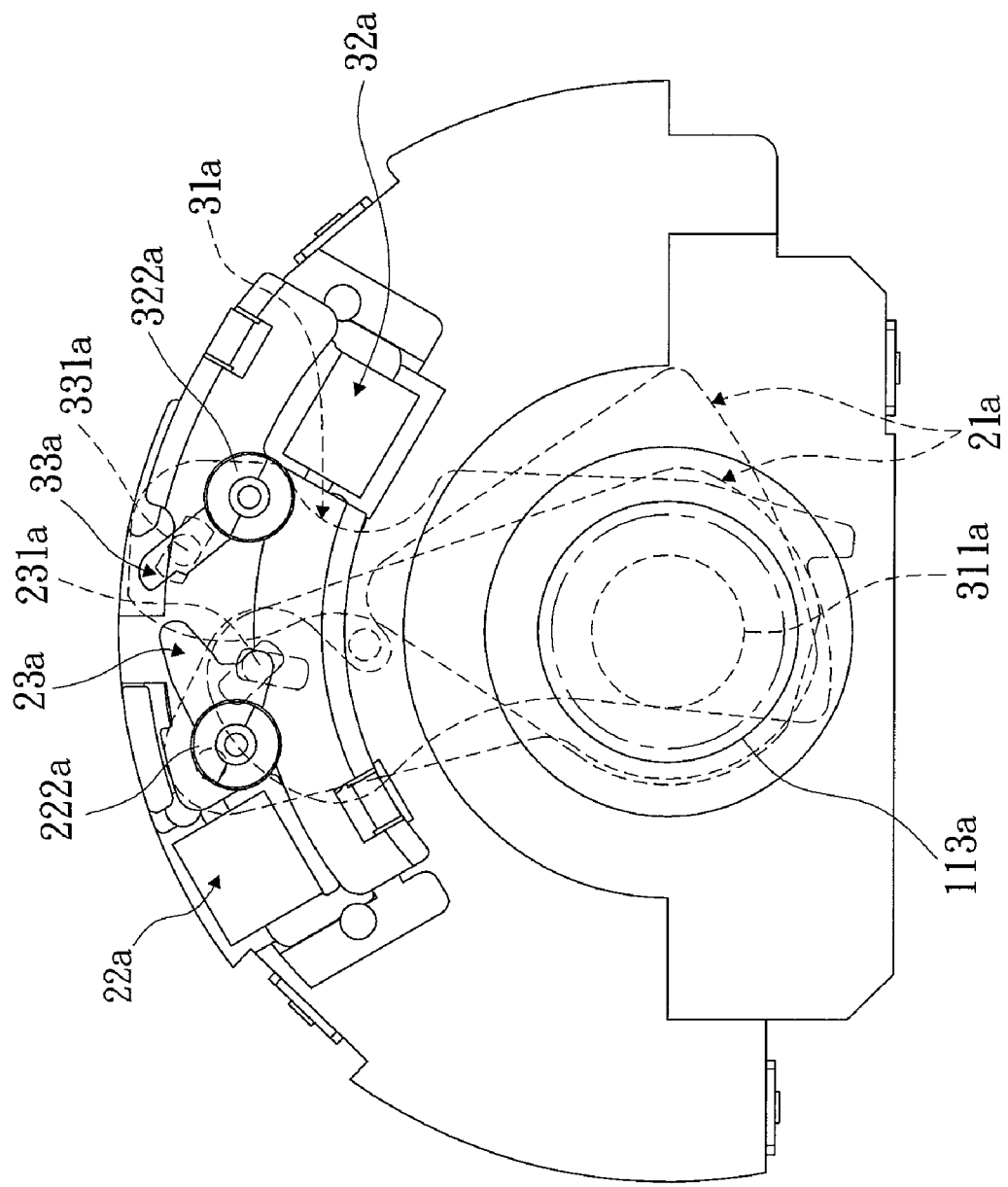
FIG. 4 is a top view showing the locations of the two shutter sheets and the first aperture plate when the toggling element and the toggled element are respectively at a covering location and a first aperture location.
Figure 5:
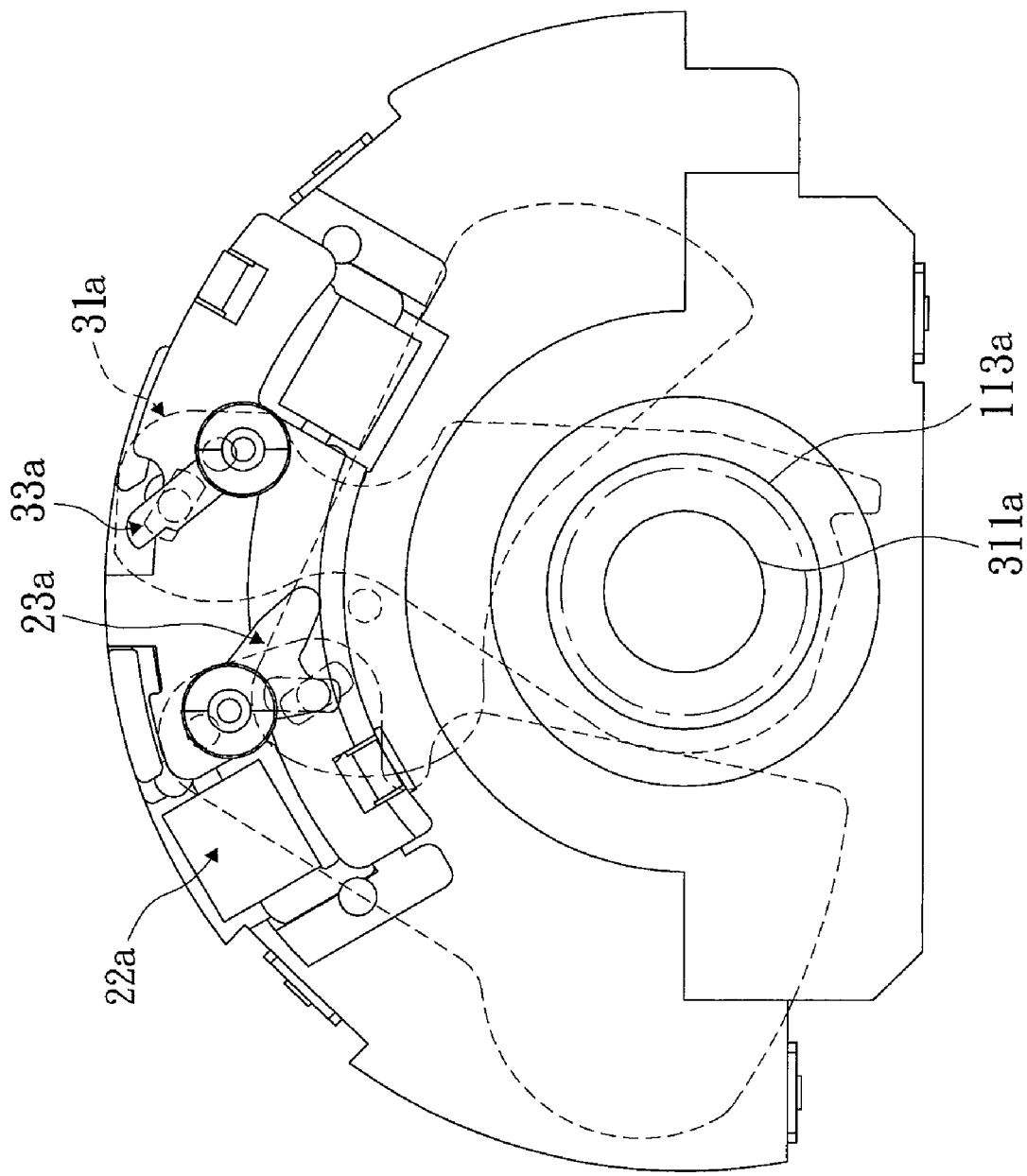
FIG. 5 is a top view showing the locations of the two shutter sheets and the first aperture plate when the toggling element and the toggled element are respectively at the opening location and the first aperture location.

FIGS. 3 and 4 depict the operation of the aperture-ring-and-shutter device E1. When the toggling element 23a is located at the opening location and the toggled element 33a is located at the large aperture location, the shutter sheets 21a and the first aperture plate 31a are disposed away from the optical opening 113a of the base 11a so that the light passing through the optical opening 113a of the base 11a, the large aperture 121a of the large aperture plate 12a, and the primary pressure/cover plate 13a along the optical axis Y1 is maximized.

To cover the optical opening 113a of the base 11a by the shutter sheets 21a, the shutter-driving element 22a is actuated to attract and rotate the first magnetic element 222a counterclockwise about its own axis, and rotate the toggling element 23a synchronously. Thus, the shutter sheets 21a are moved close to each other by the guide bar 231a of the toggling element 23a until the toggling element 23a is switched to the covering location. When the toggling element 23a is being switched from the opening location to the covering location, due to the toggled element 33a being located at the path of the toggling element 23a, the toggled element 33a is pushed by the toggling element 23a to rotate clockwise about the second magnetic element 322a, and the first aperture plate 31a is guided by the guide pin 331a of the toggled element 33a toward the optical opening 113a of the base 11a until the toggled element 33a is switched to the first aperture location. Thus, the first aperture 311a of the first aperture plate 31a and the optical opening 113a of the base 11a are in superposition (shown in FIG. 4). To remove the shutter sheets 21a and the first aperture plate 31a from the optical opening 113a of the base 11a of the base unit 1a, the shutter-driving element 22a is actuated to rotate the toggling element 23a clockwise to the opening location so that the shutter sheets 21a are removed from the optical opening 113a of the base 11a of the base unit 1a, and the diaphragm-driving element 32a is actuated to rotate the toggled element 33a counterclockwise to the large aperture location (shown in FIG. 3) so that the first aperture plate 31a is removed from the optical opening 113a of the base 11a of the base unit 1a.

FIG. 3 depicts the toggling element 23a and the toggled element 33a respectively at the opening location and the large aperture location. To reduce the light passing through the optical opening 113a of the base 11a and the primary pressure/cover plate 13a, the first aperture 311a of the first aperture plate 31a and the optical opening 113a of the base 11a are required to be in superposition. When operating, the shutter-driving element 22a is actuated to switch the toggling element 23a to the covering location, and the toggled element 33a is switched to the first aperture location. Thus, the first aperture 311a of the first aperture plate 31a and the optical opening 113a of the base 11a are in superposition (shown in FIG. 4). Then, the shutter-driving element 22a is actuated again and switched to the opening location (shown in FIG. 5), thereby reducing the light passing through the primary pressure/cover plate 13a. On the other hand, the diaphragm-driving element 32a is actuated to switch the toggled element 33a from the first aperture location to the large aperture location (shown in FIG. 3), thereby increasing the light passing through the primary pressure/cover plate 13a along the optical axis Y1.

As described, the superposition of the first aperture 311a of the first aperture plate 31a and the optical opening 113a of the base 11a is achieved only by actuating the shutter-driving element 22a (for switching the toggled element 33a from the large aperture location to the first aperture location when the toggling element 23a is switched from the opening location to the covering location). Thus, the electric current supplied to the diaphragm-driving element 32a travels in one direction. Therefore, the management of power for operating the shutter-driving element 22a and the diaphragm-driving element 32a is simpler than that of the prior art.

It is understood that the number of the shutter sheets 21a can be changed to one if the optical opening 113a of the base 11a can be covered by a single shutter sheet 21a.

Figure 6:
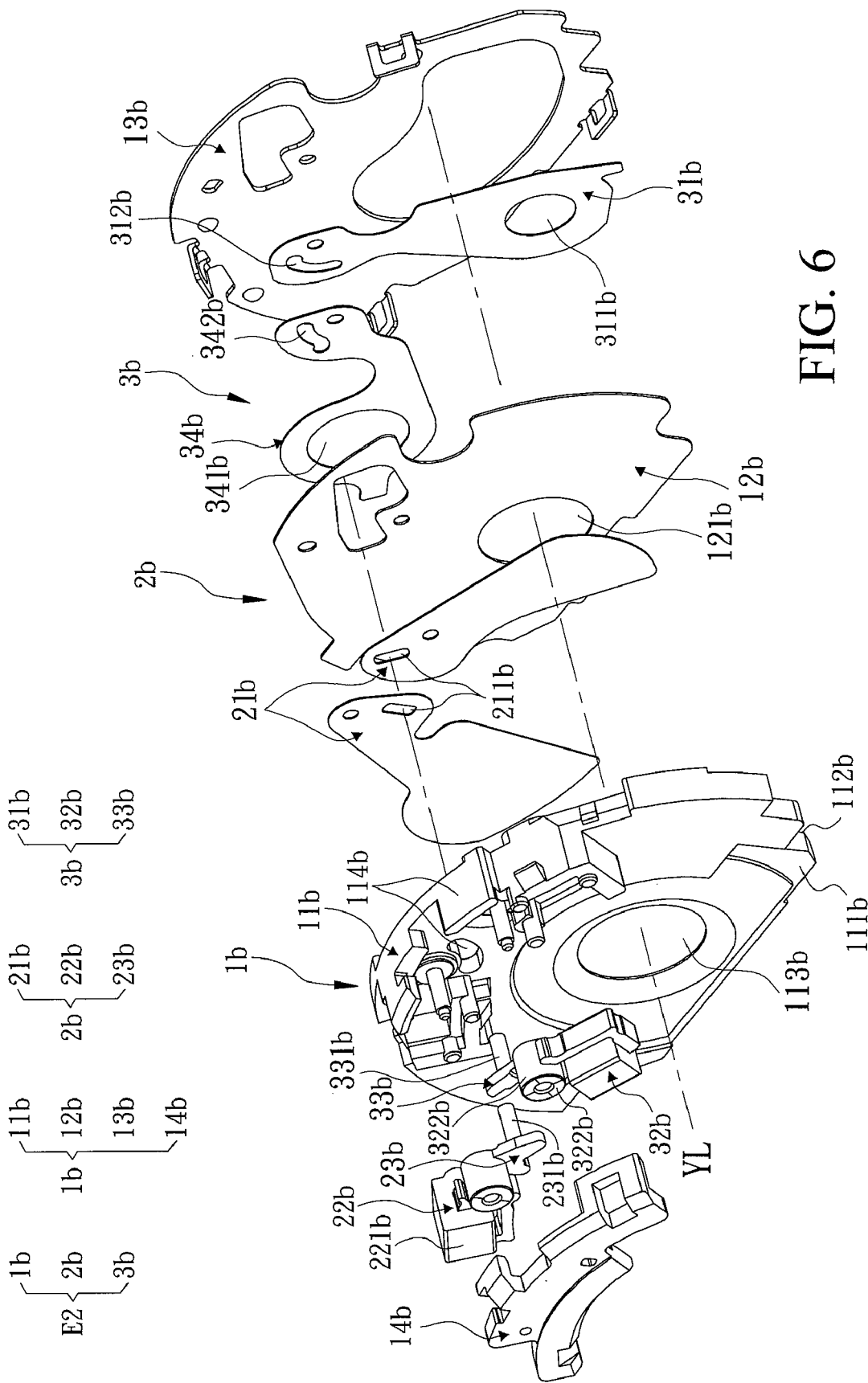
FIG. 6 is an exploded perspective diagram showing an aperture-ring-and-shutter device in accordance with a second embodiment of the invention.
Figure 7:
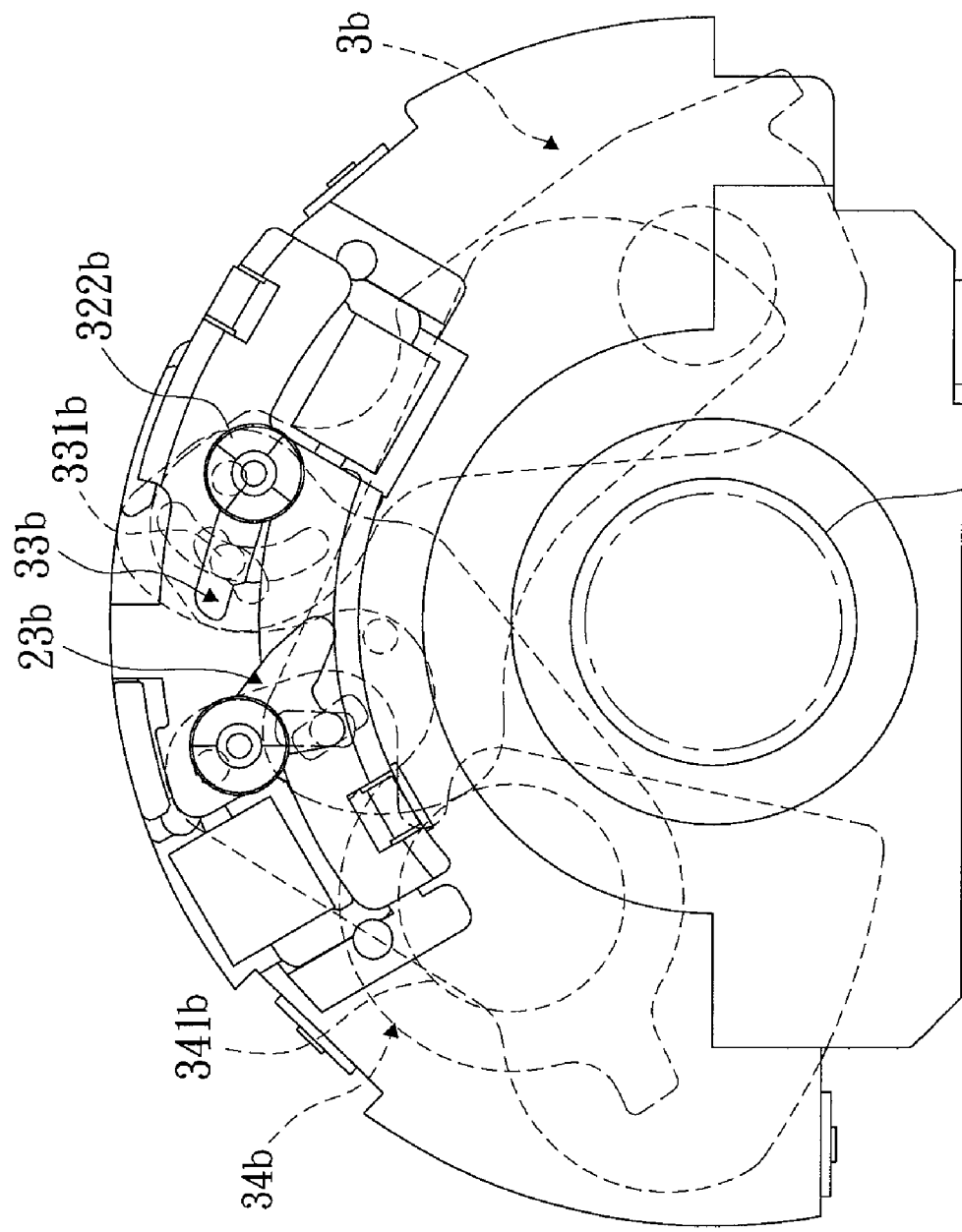
FIG. 7 is a top view showing the locations of two shutter sheets, a first aperture plate, and a second aperture plate when a toggling element and a toggled element are respectively at an opening location and a large aperture location.

FIGS. 6 and 7 depict an aperture-ring-and-shutter device E2 of a second embodiment. The aperture-ring-and-shutter device E2 includes a base unit 1b, a shutter unit 2b, and a diaphragm unit 3b.

The base unit 1b includes a base 11b, a large aperture plate 12b, a primary pressure/cover plate 13b and a secondary pressure/cover plate 14b. The base 11b has a first surface 111b, a second surface 112b opposing the first surface 111b, an optical opening 113b penetrating through the first and second surfaces 111b and 112b along an optical axis Y2, and two curved slots 114b penetrating through the first and second surfaces 111b and 112b along the optical axis Y2.

The shutter unit 2b includes two shutter sheets 21b pivoted to the base 11b, a shutter-driving element 22b disposed on the first surface 111b, and a toggling element 23b driven by the shutter-driving element 22b. Each of the shutter sheets 21b, disposed between the base 11b and the large aperture plate 12b, has an elongated hole 211b. The shutter-driving element 22b has a first electromagnetic actuator 221b and a first magnetic element 222b pivoted to the base 11b of the base unit 1b and firmly connected to the toggling element 23b. The first magnetic element 222b is driven by the first electromagnetic actuator 221b to spin about its own axis. The toggling element 23b has a guide bar 231b passing through one of the curved slots 114b of the base 11b of the base unit 1b and the elongated holes 211b of the shutter sheets 21b utilized to rotate the shutter sheets 21b.

The diaphragm unit 3b includes a first aperture plate 31b pivoted to the base 11b, a diaphragm-driving element 32b disposed on the first surface 111b, a toggled element 33b driven by the diaphragm-driving element 32b, and a second aperture plate 34b. The first aperture plate 31b has a first aperture 311b and an elongated hole 312b. The diaphragm-driving element 32b includes a second electromagnetic actuator 321b and a second magnetic element 322b pivoted to the base 11b of the base unit 1b and firmly connected to the toggled element 33b. The second magnetic element 322b is driven by the second electromagnetic actuator 321b to spin about its own axis. The toggled element 33b has a guide pin 331b passing through the other curved slot 114b of the base 11b of the base unit 1b and the elongated holes 312b of the first aperture plate 31b for rotating the first aperture plate 31b.

Figure 10:
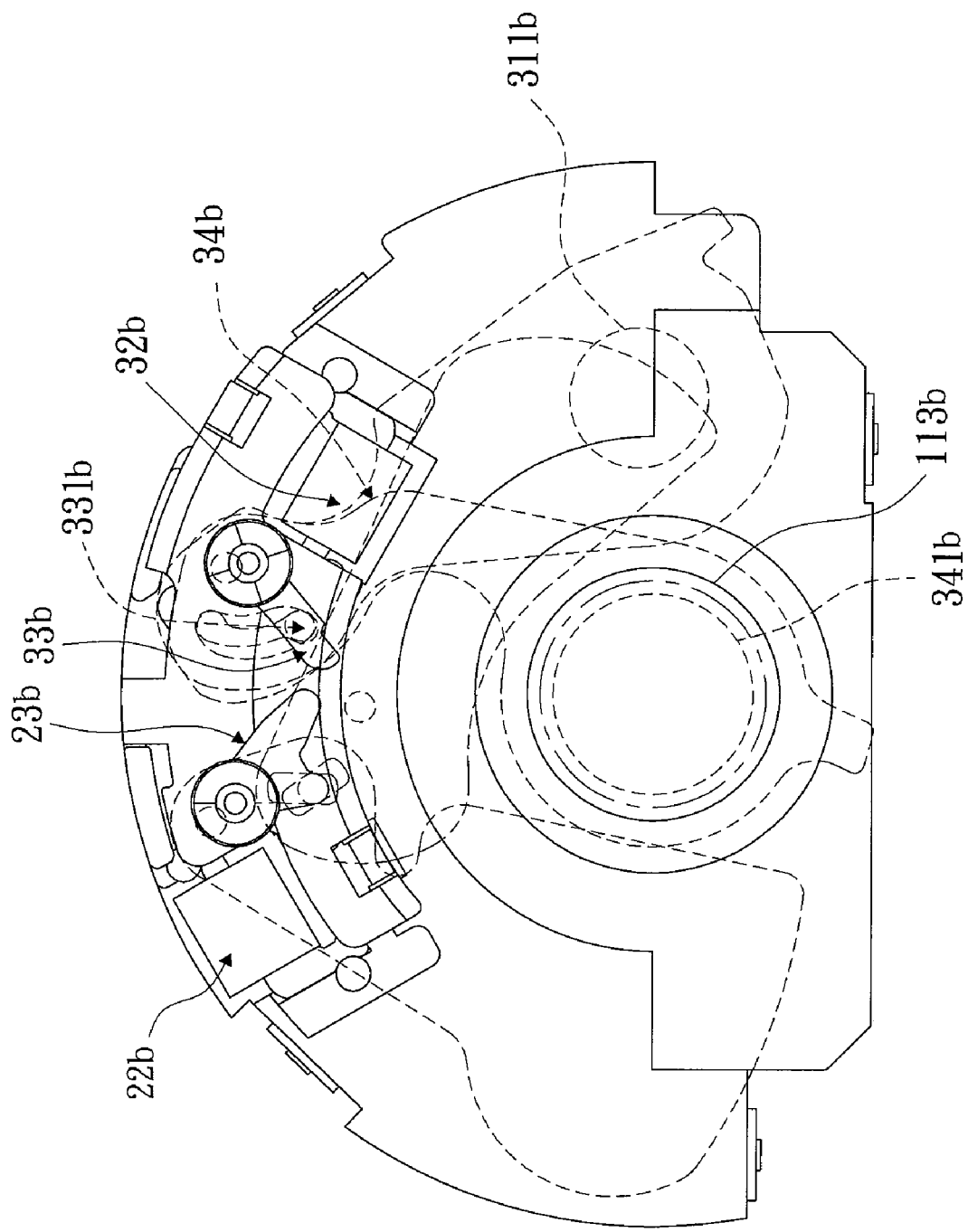
FIG. 10 is a top view showing the locations of the two shutter sheets, the first aperture plate, and the second aperture plate when the toggling element and the toggled element are respectively at the opening location and a second aperture location.
Figure 11:
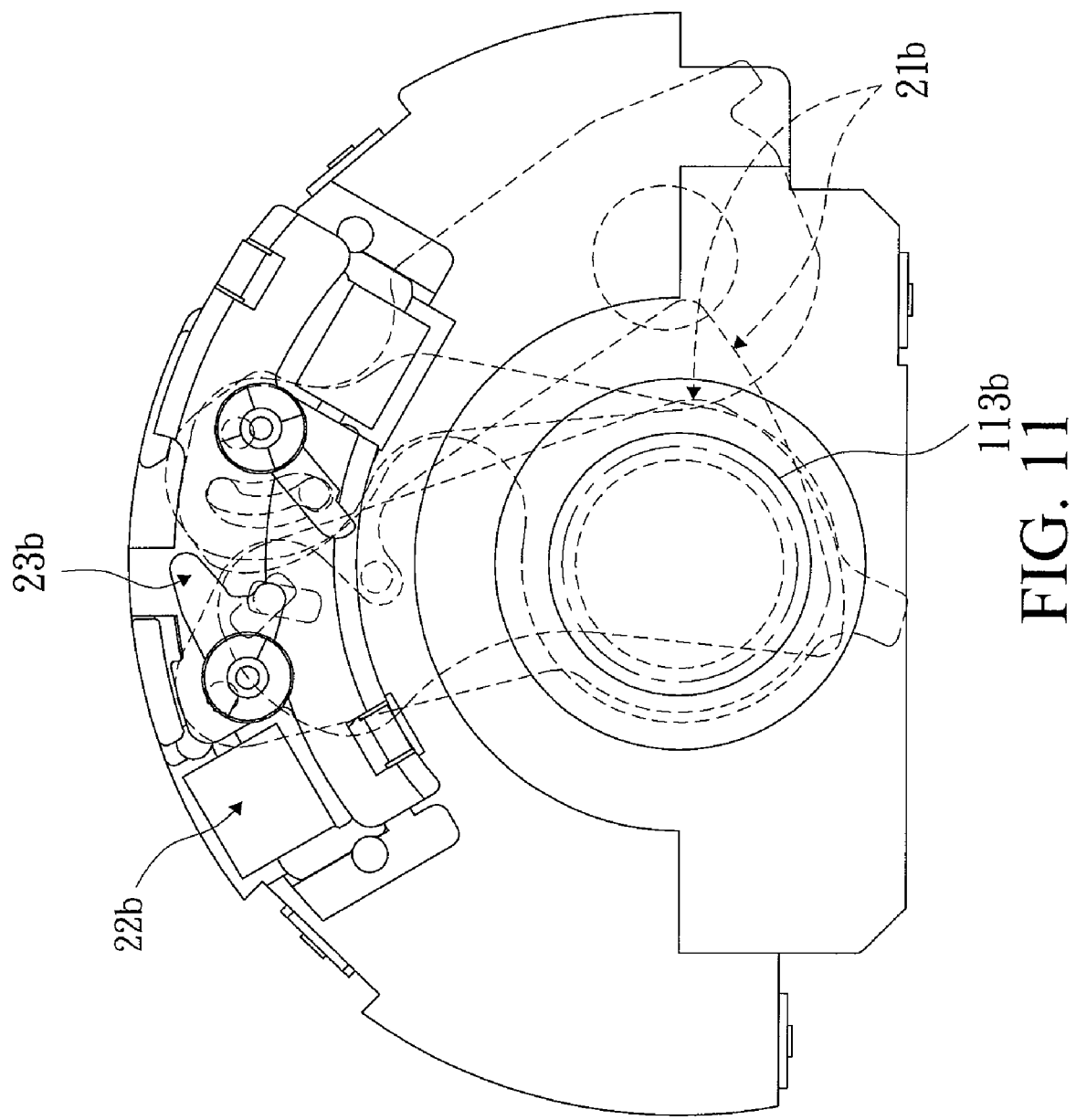
FIG. 11 is a top view showing the locations of the two shutter sheets, the first aperture plate, and the second aperture plate when the toggling element and the toggled element are respectively at the covering location and the second aperture location.

Note that the aperture-ring-and-shutter device E2 of the second embodiment differs from the aperture-ring-and-shutter device E1 of the first embodiment in that the second magnetic element 322b of the diaphragm-driving element 32b of the diaphragm unit 3b is a four pole magnet, the second aperture plate 34b is pivotally provided between the large aperture plate 12b and the primary pressure/cover plate 13b, the second aperture plate 34b can be moved by the guide pin 331b of the toggled element 33b, and the second aperture plate 34b has an elongated hole 342b and a second aperture 341b which is greater than the first aperture 311b of the first aperture plate 31b and less than the large aperture 121b of the large aperture plate 12b. Further, the shutter-driving element 32b is capable of switching the toggled element 33b between a second aperture location (shown in FIGS. 10 and 11) and a large aperture location (shown in FIG. 7), so that the guide pin 331b of the toggled element 33b can rotate the second aperture plate 34b and force the second aperture 341b of the second aperture plate 34b and the optical opening 113b of the base 11b in superposition or apart. When the toggled element 33b is located at the large aperture location and the toggling element 23b is switched from the covering location to the opening location, the toggled element 33b is switched to the second aperture location by the toggling element 23b.

Referring to FIG. 7, when the toggling element 23b is located at the opening location and the toggled element 33b is located at the large aperture location, the shutter sheets 21b, the first aperture plate 31b, and the second aperture plate 34b are disposed away from the optical opening 113b of the base 11b so that the light passing through the optical opening 113b of the base 11b, the large aperture 121b of the large aperture plate 12b, and the primary pressure/cover plate 13b along the optical axis Y2 is maximized.

Figure 8:
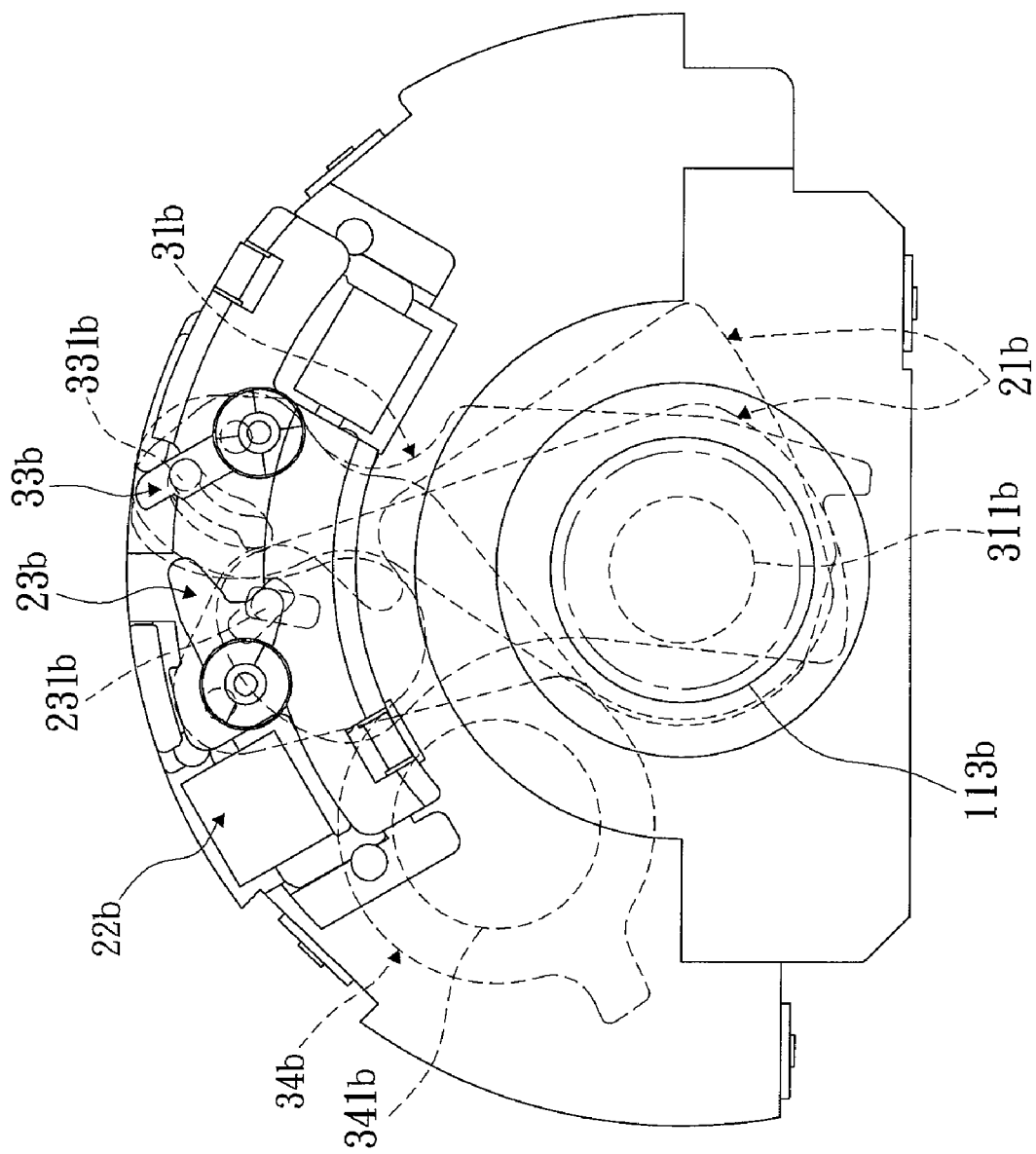
FIG. 8 is a top view showing the locations of the two shutter sheets, the first aperture plate, and the second aperture plate when the toggling element and the toggled element are respectively at a covering location and a first aperture location.

Referring also to FIG. 8, to cover the optical opening 113b of the base 11b by the shutter sheets 21b, the shutter-driving element 22b is actuated to rotate the toggling element 23b counterclockwise. Thus, the shutter sheets 21b are moved close to each other by the guide bar 231b of the toggling element 23b until the toggling element 23b is switched to the covering location. When the toggling element 23b is being switched from the opening location to the covering location, the toggled element 33b is pushed by the toggling element 23b to rotate clockwise, and the first aperture plate 31b is guided by the guide pin 331b of the toggled element 33b toward the optical opening 113b of the base 11b until the toggled element 33b is switched to the first aperture location. Thus, the first aperture 311b of the first aperture plate 31b and the optical opening 113b of the base 11b are in superposition, and the second aperture 341b of the second aperture plate 34b is apart from the optical opening 113b of the base 11b of the base unit 1b. To remove the shutter sheets 21b and the first aperture plate 31b from the optical opening 113b of the base 11b of the base unit 1b, the shutter-driving element 22b is actuated to rotate the toggling element 23b clockwise to the opening location (shown in FIG. 9) so that the shutter sheets 21b are removed from the optical opening 113b of the base 11b of the base unit 1b, and the diaphragm-driving element 32b is actuated to rotate the toggled element 33b counterclockwise to the large aperture location (shown in FIG. 7) so that the first aperture plate 31b is removed from the optical opening 113b of the base 11b of the base unit 1b.

Figure 9:
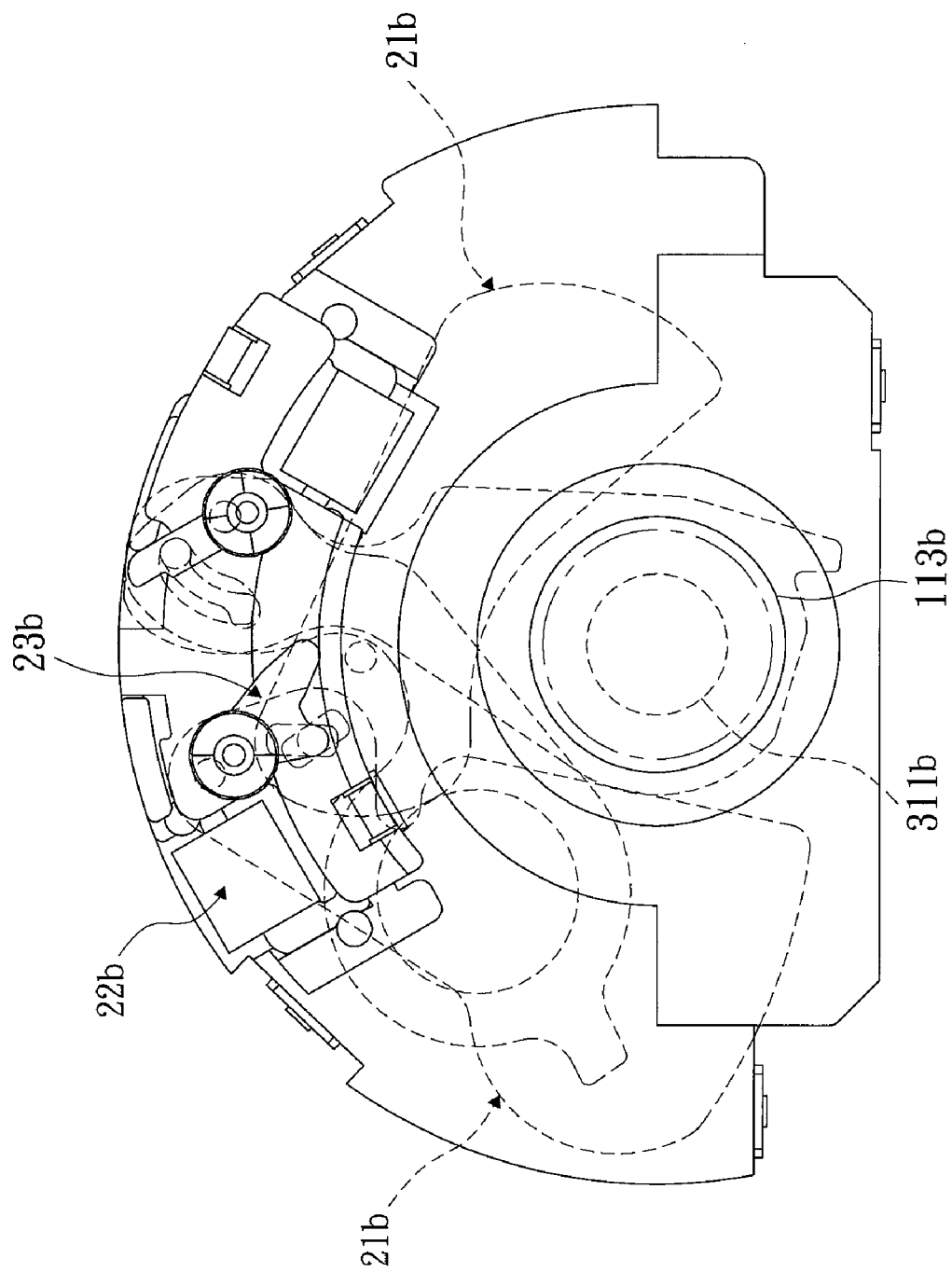
FIG. 9 is a top view showing the locations of the two shutter sheets, the first aperture plate, and the second aperture plate when the toggling element and the toggled element are respectively at the opening location and the first aperture location.

Referring to FIGS. 6, 8 and 9, if the light passing through the primary pressure/cover plate 13b along the optical axis Y2 is required to equal the light passing through the first aperture 311b of the first aperture plate 31b (i.e., when the first aperture 311b of the first aperture plate 31b and the optical opening 113b of the base 11b are in superposition) (shown in FIG. 8), the toggling element 23b is in the covering location with the optical opening 113b of the base 11b covered by the shutter sheets 21b, the shutter-driving element 22b is actuated to switch the toggling element 23b to the opening location and move the shutter sheets 21b away from the optical opening 113b of the base 11b (shown in FIG. 9), and therefore the light passing through the primary pressure/cover plate 13b is equal to the light passing through the first aperture 311b of the first aperture plate 31b.

Referring to FIGS. 6, 8, 10 and 11, if the light passing through the primary pressure/cover plate 13b along the optical axis Y2 is required to equal the light passing through the second aperture 341b of the second aperture plate 34b (i.e., the second aperture 341b of the second aperture plate 34b and the optical opening 113b of the base 11b are in superposition) and when the toggling element 23b and the toggled element 33b are respectively at the covering location and the first aperture location (shown in FIG. 8), the diaphragm-driving element 32b is actuated to switch the toggled element 33b to the large aperture location and move the first aperture 311b of the first aperture plate 31b away from the optical opening 113b of the base 11b. Then, the shutter-driving element 22b is actuated to switch the toggling element 23b to the opening location and move the toggled element 33b toward the second aperture location. Thus, the second aperture plate 34b is rotated by the guide pin 331b of the toggled element 33b so that the second aperture 341b of the second aperture plate 34b and the optical opening 113b of the base 11b are in superposition (shown in FIG. 10). Thus, the light passing through the primary pressure/cover plate 13b is equal to the light passing through the second aperture 341b of the second aperture plate 34b. On the other hand, to close the optical opening 113b of the base 11b, the shutter-driving element 22b is actuated again for switching the toggling element 23b to the covering location (shown in FIG. 11).

The aperture-ring-and-shutter device E2 of the second embodiment is capable of providing the same function as the aperture-ring-and-shutter device E1 of the first embodiment, wherein the toggling element 23b from the covering location to the opening location pushes the toggled element 33b from the large aperture location to the second aperture location so that the second aperture 341b of the second aperture plate 34b and the optical opening 113b of the base 11b are in superposition. As compared to the prior art in which an increased number of aperture rings requires more driving elements, the aperture-ring-and-shutter device E2 of the second embodiment is capable of controlling the second aperture plate 34b without an increased number of diaphragm-driving elements 32*b*. Therefore, the volume, the number of parts, and the manufacturing cost of the aperture-ring-and-shutter device can be reduced.

Figure 12:
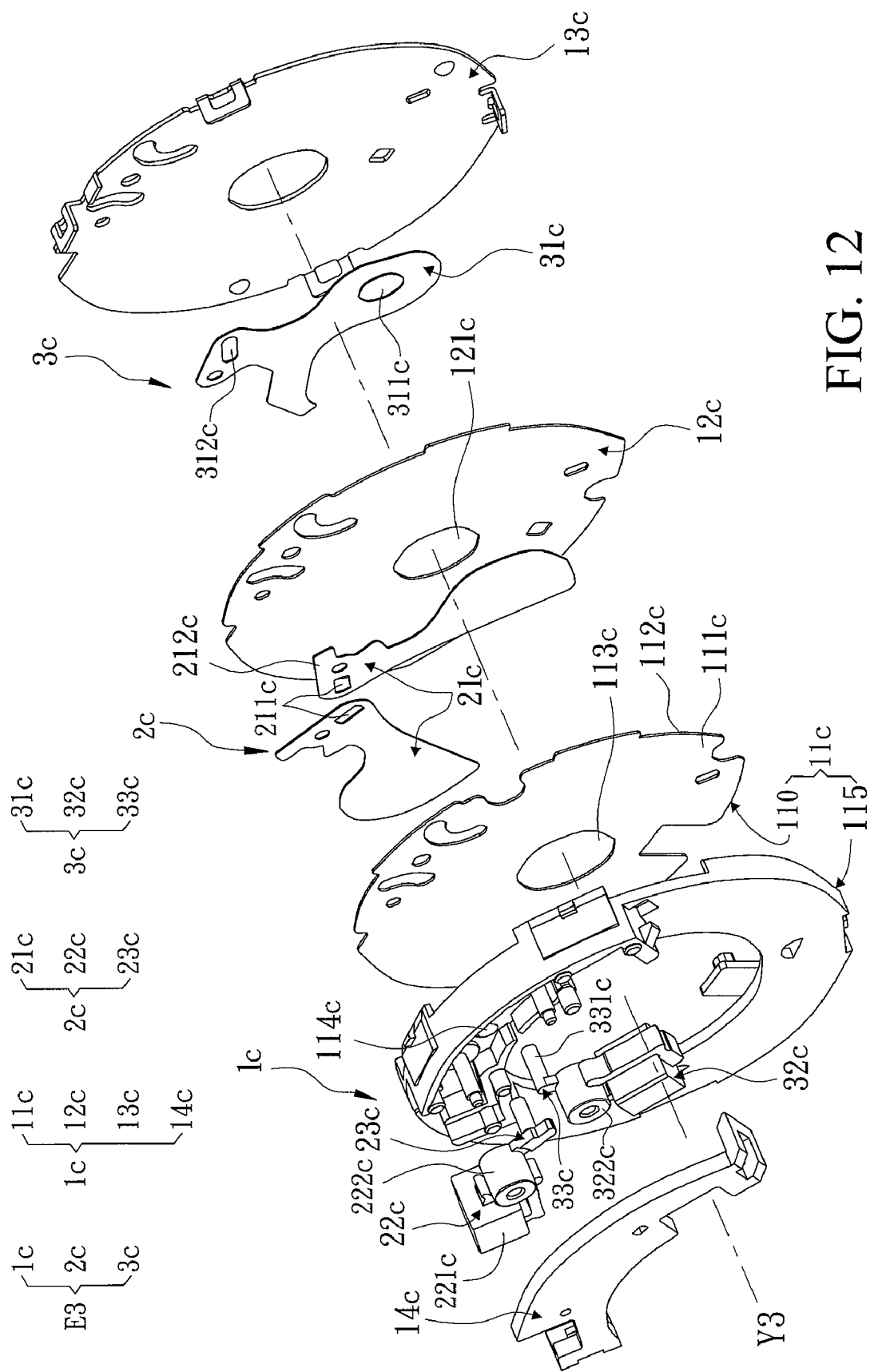
FIG. 12 is an exploded perspective diagram showing an aperture-ring-and-shutter device in accordance with a third embodiment of the invention.
Figure 13:
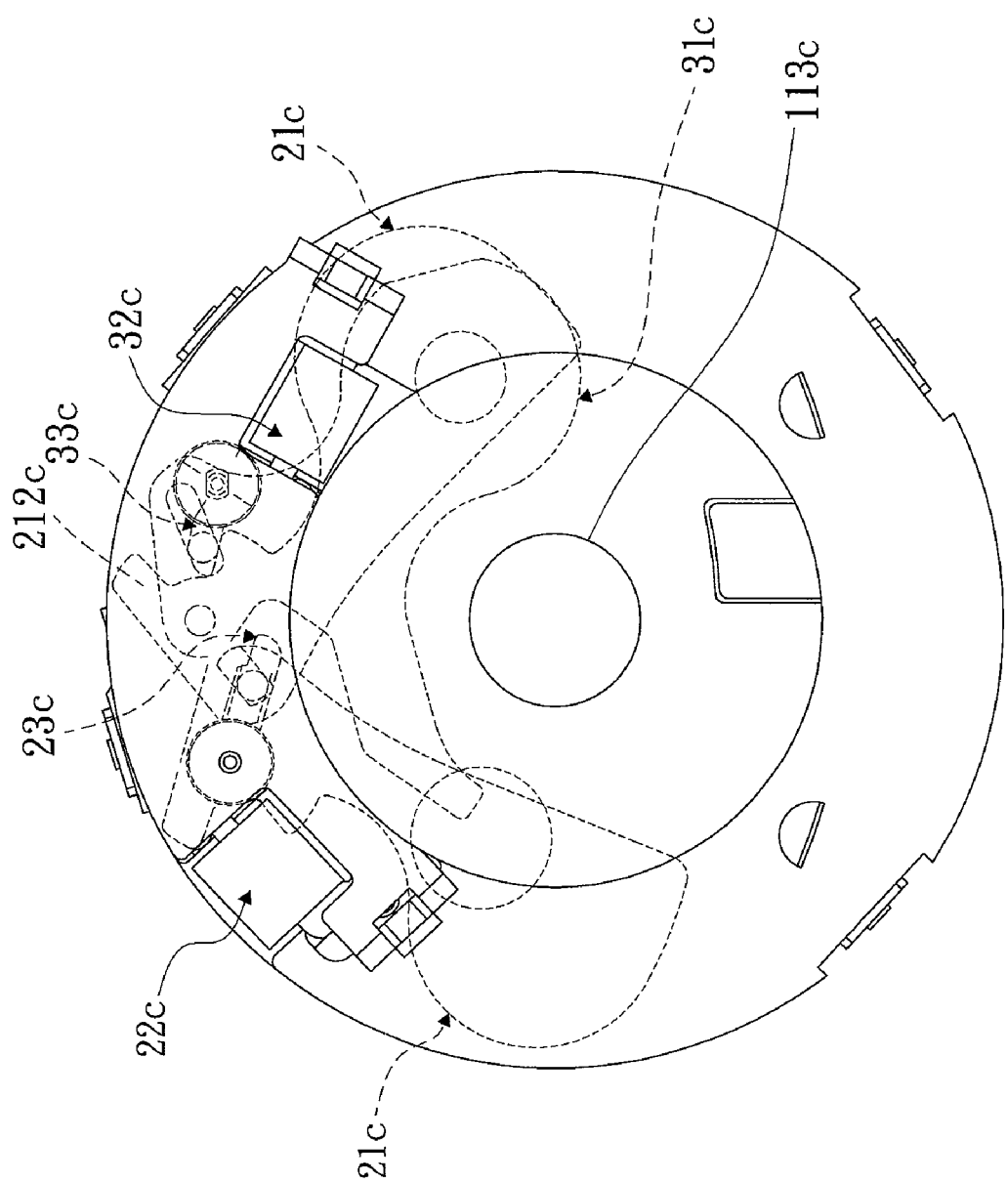
FIG. 13 is a top view showing the locations of two shutter sheets and a first aperture plate when a toggling element and a toggled element are respectively at an opening location and a large aperture location.
Figure 14:
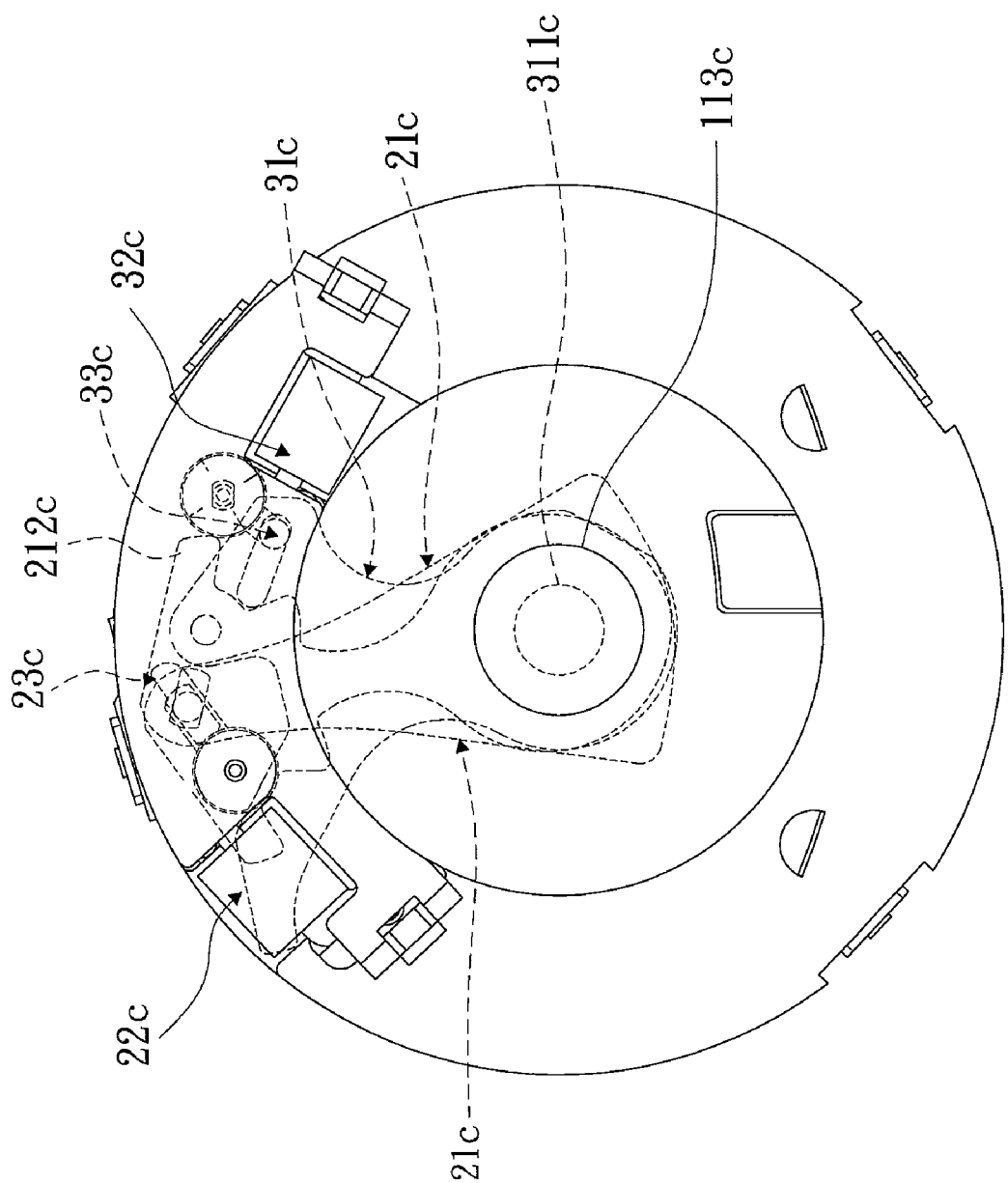
FIG. 14 is a top view showing the locations of the two shutter sheets and the first aperture plate when the toggling element and the toggled element are respectively at a covering location and a first aperture location.
Figure 15:
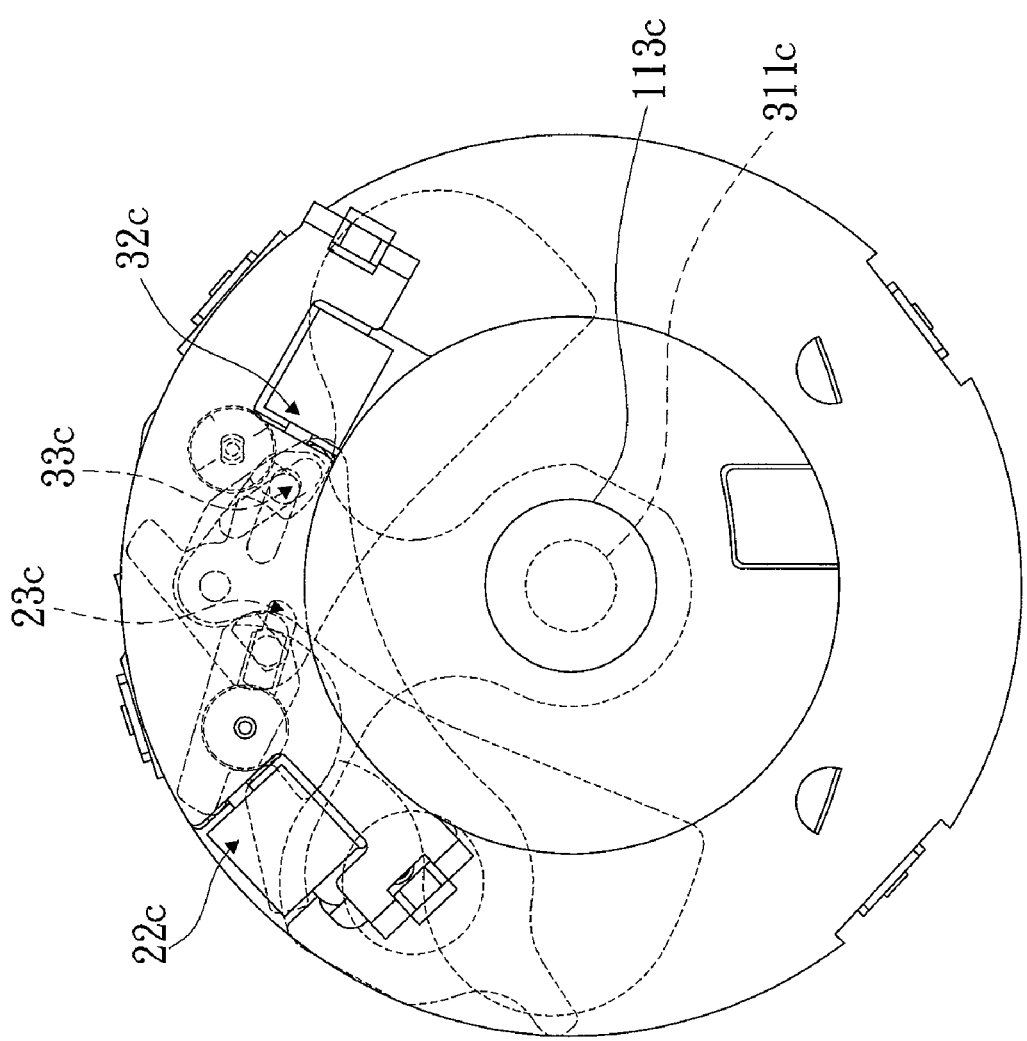
FIG. 15 is a top view showing the locations of the two shutter sheets and the first aperture plate when the toggling element and the toggled element are respectively at the opening location and the first aperture location.

FIGS. 12, 13 and 14 depict an aperture-ring-and-shutter device E3 of a third embodiment. The aperture-ring-and-shutter device E3 includes a base unit 1*c*, a shutter unit 2*c* and a diaphragm unit 3*c*.

The base unit 1*c* includes a base 11*c*, a large aperture plate 12*c*, a primary pressure/cover plate 13*c* and a secondary pressure/cover plate 14*c*. The base 11*c* of the base unit 1*c* has a base body 115, two curved slots 114*c* penetrating through the base body 115 along the optical axis Y3, and an optically perforated board 110 connected to the base body 115. The optically perforated board 110 has a first surface 111*c*, a second surface 112*c* opposing the first surface 111*c*, an optical opening 113*c* penetrating through the first and second surfaces 111*c* and 112*c* along an optical axis Y3.

The shutter unit 2*c* includes two shutter sheets 21*c* pivotally disposed on the base 11*c* of the base unit 1*c*, a shutter-driving element 22*c* disposed on the base 11*c* of the base unit 1*c*, and a toggling element 23*c* actuated by the shutter-driving element 22*c*. Each of the shutter sheets 21*c* of the shutter unit 2*c* has an elongated hole 211*c* and an arm 212*c*. The shutter-driving element 22*c* has a first electromagnetic actuator 221*c* and a first magnetic element 222*c* pivoted on the base 11*c* of the base unit 1*c* and firmly connected to the toggling element 23*c* of the shutter unit 2*c*. The toggling element 23*c* has a guide bar 231*c* passing through one of the curved slots 114*c* of the base 11*c* of the base unit 1*c* and the elongated holes 211*c* of the shutter sheets 21*c* of the shutter unit 2*c* and is utilized to rotate the at least one shutter sheet 21*c*. The shutter-driving element 22*c* switches the toggling element 23*c* between an opening location and a covering location, so that the guide bar 231*c* of the toggling element 23*c* forces the at least one shutter sheet 21*c* to expose or cover the optical opening 113*c* of the optically perforated board 110 of the base 11*c* of the base unit 1*c*.

The diaphragm unit 3*c* includes a first aperture plate 31*c*, a diaphragm-driving element 32*c* disposed on the base 11*c*, and a toggled element 33*c* pushed by the diaphragm-driving element 32*c*. The first aperture plate 31*c* has an elongated hole 312*c* and a first aperture 311*c* less than the optical opening 113 of the base unit 1*c*. The diaphragm-driving element 32*c* of the diaphragm unit 3*c* has a second electromagnetic actuator 321*c* and a second magnetic element 322*c* pivoted on the base 11*c* of the base unit 1*c* and firmly connected to the toggled element 33*c*. The diaphragm-driving element 32*c* drives the toggled element 33*c* from a first aperture location to a large aperture location. The toggled element 33*c* has a guide pin 331*c* passing through the other curved slot 114*c* of the base 11*c* of the base unit 1*c* and the elongated hole 211*c* of the first aperture plate 31*c* and is utilized to rotate the first aperture plate 31*c*, so that the first aperture 311*c* of the first aperture plate 31*c* and the optical opening 113*c* of the base unit 1*c* in superposition are switched to separate from each other. The base body 115*c* of the base 11*c* of the base unit 1*c* is provided for the installation of the first magnetic element 222*c* of the shutter-driving element 22*c* of the shutter unit 2*c* and the second magnetic element 322*c* of the diaphragm-driving element 32*c* of the diaphragm unit 3*c*. When the toggled element 33*c* of the diaphragm unit 3*c* is located at the large aperture location and the toggling element 23*c* is switched from the opening location to the covering location, the toggled element 33 is switched to the first aperture location by the arm 212*c* of the at least one shutter sheet 21*c* (shown in FIG. 14).

When the shutter unit 2*c*, the diaphragm unit 3*c*, and the base unit 1*c* are assembled, the optically perforated board 110 of the base 11*c* of the base unit 1*c*, the shutter sheets 21*c* of the shutter unit 2*c*, the large aperture plate 12*c* of the base unit 1*c* and the first aperture plate 31*c* are connected to the base body 115 of the base 11*c* by fastening the primary pressure/cover plate 13*c* and the base body 115 of the base 11*c*, and the shutter-driving element 22*c*, the diaphragm-driving element 32*c*, the toggling element 23*c*, and the toggled element 33*c* are connected to the base body 115 of the base 11*c* by fastening the secondary pressure/cover plate 14*c* and the base body 115 of the base 11*c*.

FIG. 14 depicts the operation of the aperture-ring-and-shutter device E3. When the toggling element 23*c* is located at the opening location and the toggled element 33*c* is located at the large aperture location, the shutter sheets 21*c* and the first aperture plate 31*c* are disposed away from the optical opening 113*c* of the base 11*c* of the base unit 1*c* so that the light passing through the optical opening 113*c* of the base 11*c* of the base unit 1*c*, the large aperture 121*c* of the large aperture plate 12*c*, and the primary pressure/cover plate 13*c* along the optical axis Y3 is maximized.

To cover the optical opening 113*c* of the base 11*c* of the base unit 1*c* by the shutter sheets 21*c*, the shutter-driving element 22*c* is actuated to rotate the toggling element 23*c* counterclockwise and switch to the covering location (shown in FIG. 14). When the toggling element 23*c* is being switched from the opening location to the covering location, due to the toggled element 33*c* being located at the rotating path of the arm 212*c* of the at least one shutter sheet 21*c*, the toggled element 33*c* is pushed by the toggling element 23*c* to switch the first aperture plate 31*c* to the first aperture location. To remove the shutter sheets 21*c* and the first aperture plate 31*c* from the optical opening 113*c* of the base 11*c* of the base unit 1*c*, the shutter-driving element 22*c* is actuated to rotate the toggling element 23*c* clockwise to the opening location so that the shutter sheets 21*c* are removed from the optical opening 113*c* of the base 11*c* of the base unit 1*c*, and the diaphragm-driving element 32*c* is actuated to rotate the toggled element 33*c* counterclockwise to the large aperture location so that the first aperture plate 31*c* is removed from the optical opening 113*c* of the base 11*c* of the base unit 1*c* (shown in FIG. 13).

Referring to FIGS. 12 to 15, when the toggling element 23*c* and the toggled element 33*c* are respectively located at the opening location and the large aperture location (shown in FIG. 13) and if the light passing through the primary pressure/cover plate 13*c* along the optical axis Y3 is required to equal the light passing through the first aperture 311*c* of the first aperture plate 31*c*, the first aperture 311*c* of the first aperture plate 31*c* and the optical opening 113*c* of the base 11*c* must be in superposition (shown in FIG. 14). That is, the shutter-driving element 22*c* is actuated to switch the toggling element 23*c* to the covering location and the toggled element 33*c* is pushed by the arm 212*c* of the at least one shutter sheet 21*c* to the first aperture location, the first aperture 311*c* of the first aperture plate 31*c* and the optical opening 113*c* of the base 11*c* of the base unit 1*c* are in superposition (shown in FIG. 14). Then, the shutter-driving element 22*c* is actuated to switch the toggling element 23*c* to the opening location (shown in FIG. 15), and therefore the light passing through the primary pressure/cover plate 13*c* can be reduced. When the diaphragm-driving element 32*c* is actuated to switch the toggled element 33*c* from the first aperture location to the large aperture location (shown in FIG. 13), thereby increasing the light passing through the primary pressure/cover plate 13*c* along the optical axis Y3. The aperture-ring-and-shutter device E3 of the third embodiment is capable of providing the same function as the aperture-ring-and-shutter device E1 of the first embodiment.

Figure 16:
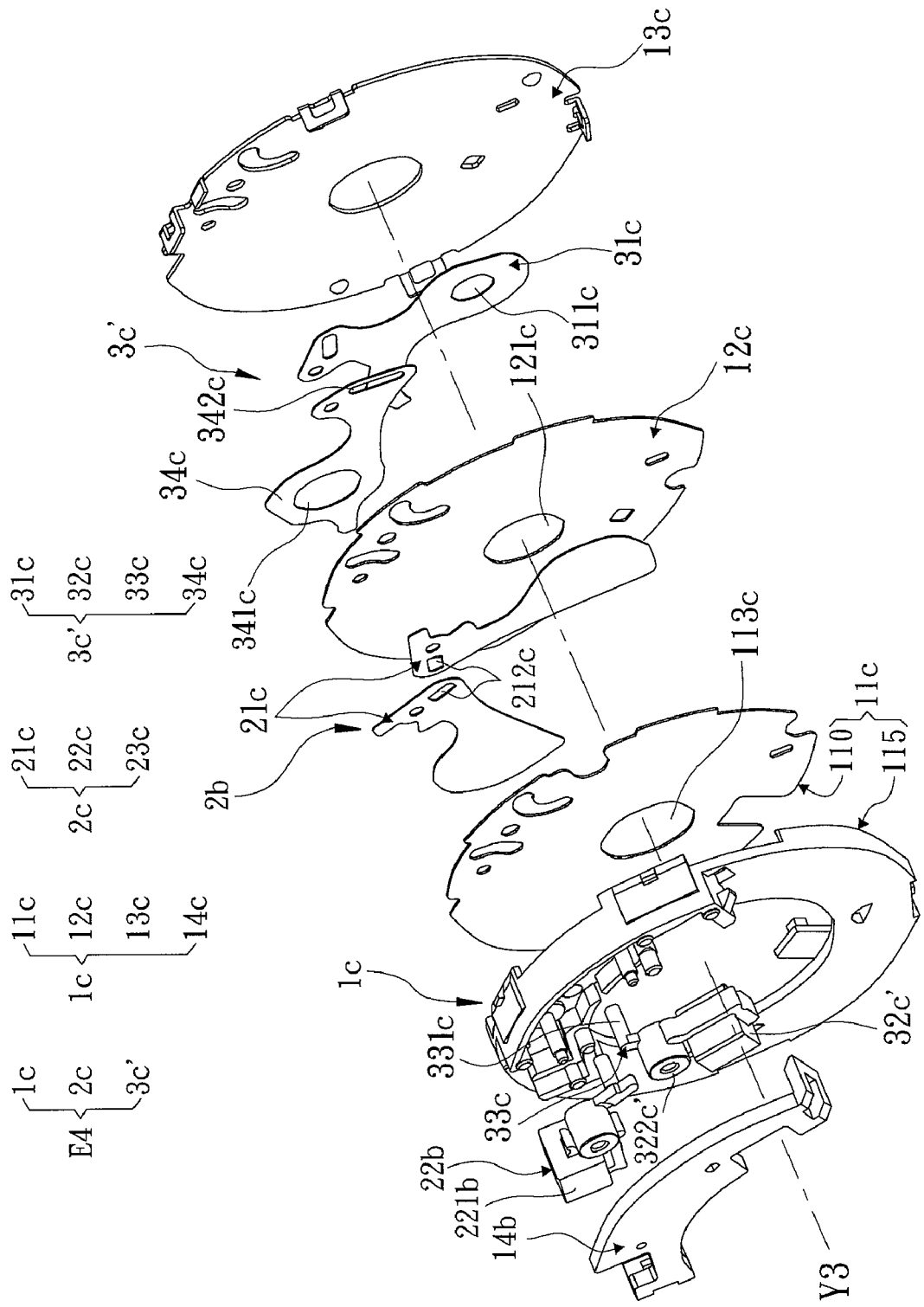
FIG. 16 is an exploded perspective diagram showing an aperture-ring-and-shutter device in accordance with a fourth embodiment of the invention.
Figure 17:
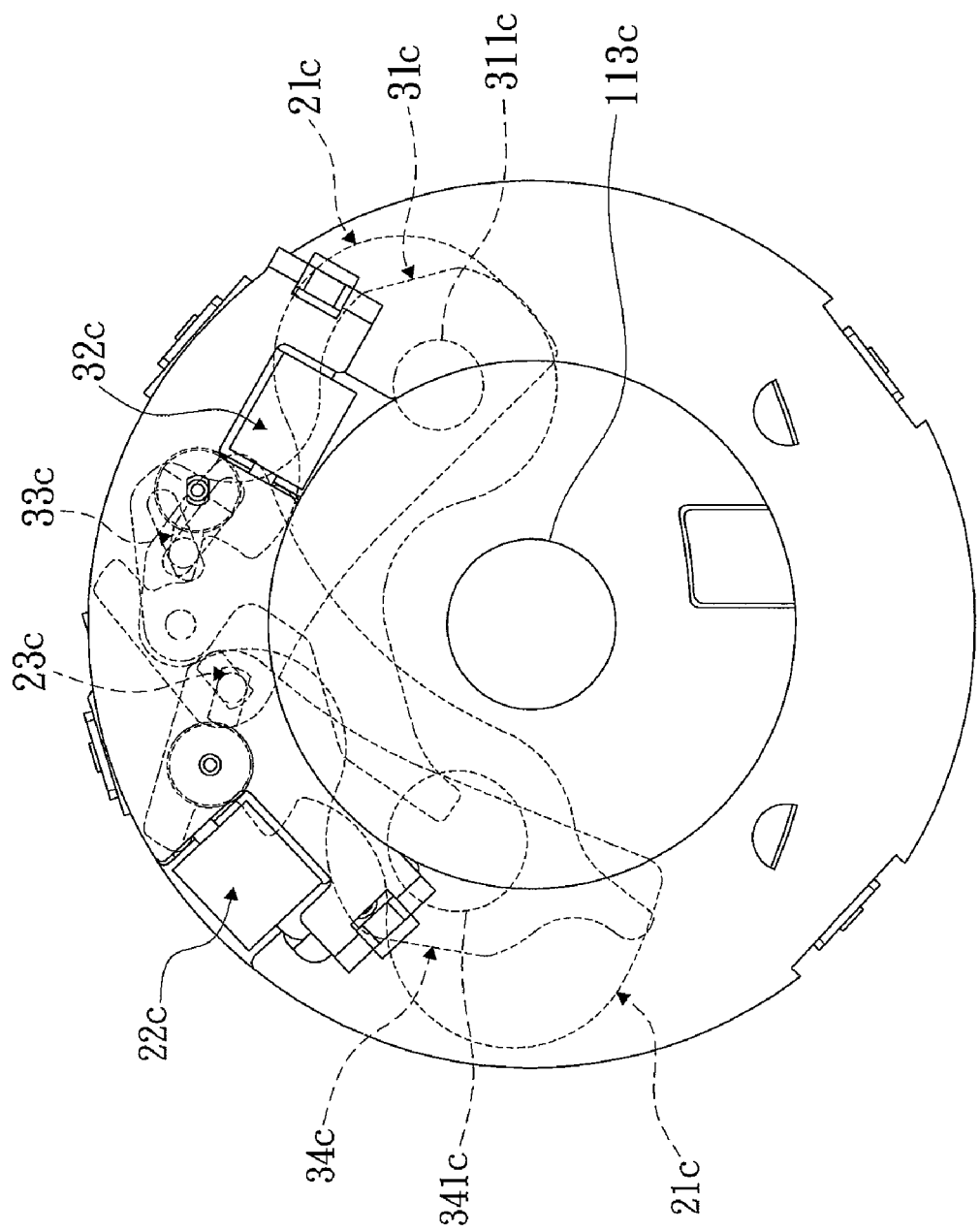
FIG. 17 is a top view showing the locations of two shutter sheets, a first aperture plate, and a second aperture plate when a toggling element and a toggled element are respectively at an opening location and a large aperture location.

FIGS. 16 and 17 depict an aperture-ring-and-shutter device E4 of a fourth embodiment. The aperture-ring-and-shutter device E4 includes a base unit 1c, a shutter unit 2c and a diaphragm unit 3c'. The aperture-ring-and-shutter device E4 of the fourth embodiment differs from the aperture-ring-and-shutter device E3 of the third embodiment in that the second magnetic element 322c' of the diaphragm-driving element 32c' of the diaphragm unit 3c' is a four pole magnet, and the diaphragm unit 3c' is further provided with a second aperture plate 34c. The second aperture plate 34c of the diaphragm unit 3c', pivotally provided between the large aperture plate 12c and the primary pressure/cover plate 13c and capable of moving by the guide pin 331c of the toggled element 33c, has an elongated hole 342c and a second aperture 341c which is greater than the first aperture 311c of the first aperture plate 31c and less than the large aperture 121c of the large aperture plate 12c. Further, the shutter-driving element 32c is capable of switching the toggled element 33c between a second aperture location (shown in FIGS. 20 and 21) and a large aperture location (shown in FIG. 17), so that the guide pin 331c of the toggled element 33c can rotate the second aperture plate 34c and force the second aperture 341c of the second aperture plate 34c and the optical opening 113c of the base 11c in superposition or apart.

When the toggling element 23c is located at the opening condition and the toggled element 33c is located at the large aperture location (shown in FIG. 17), the shutter sheets 21c, the first aperture plate 31c and the second aperture plate 34c are apart from the optical opening 113c of the base 11c, and the primary pressure/cover plate 13c and the large aperture 121c of the large aperture plate 12c along the optical axis Y3 is maximized.

Referring to FIGS. 16 to 19, to cover the optical opening 113c of the base 11c of the base unit 1c by the shutter sheets 21c of the shutter unit 2c, the shutter-driving element 22c is actuated to rotate the toggling element 23c counterclockwise and switch to the covering location. When the toggling element 23c is being switched from the opening location to the covering location, due to the arm 212c of the shutter sheet 21c being capable of pushing the toggled element 33c at the same time, the toggled element 33c is pushed by the toggling element 23c counterclockwise to switch to the first aperture location, so that the first aperture 311c of the first aperture plate 31c and the optical opening 113c of the base 11c are in superposition and the second aperture 341c of the second aperture plate 34c of the diaphragm unit 3c' is apart from the optical opening 113c of the base 11c of the base unit c. To remove the shutter sheets 21c and the first aperture plate 31c from the optical opening 113c of the base 11c of the base unit 1c, the shutter-driving element 22c is actuated to rotate the toggling element 23c clockwise to the opening location so that the shutter sheets 21c are removed from the optical opening 113c of the base 11c of the base unit 1c (shown in FIG. 19), and the diaphragm-driving element 32c is actuated to rotate the toggled element 33c counterclockwise to the large aperture location so that the first aperture plate 31c is removed from the optical opening 113c of the base 11c of the base unit 1c (shown in FIG. 17).

Figure 18:
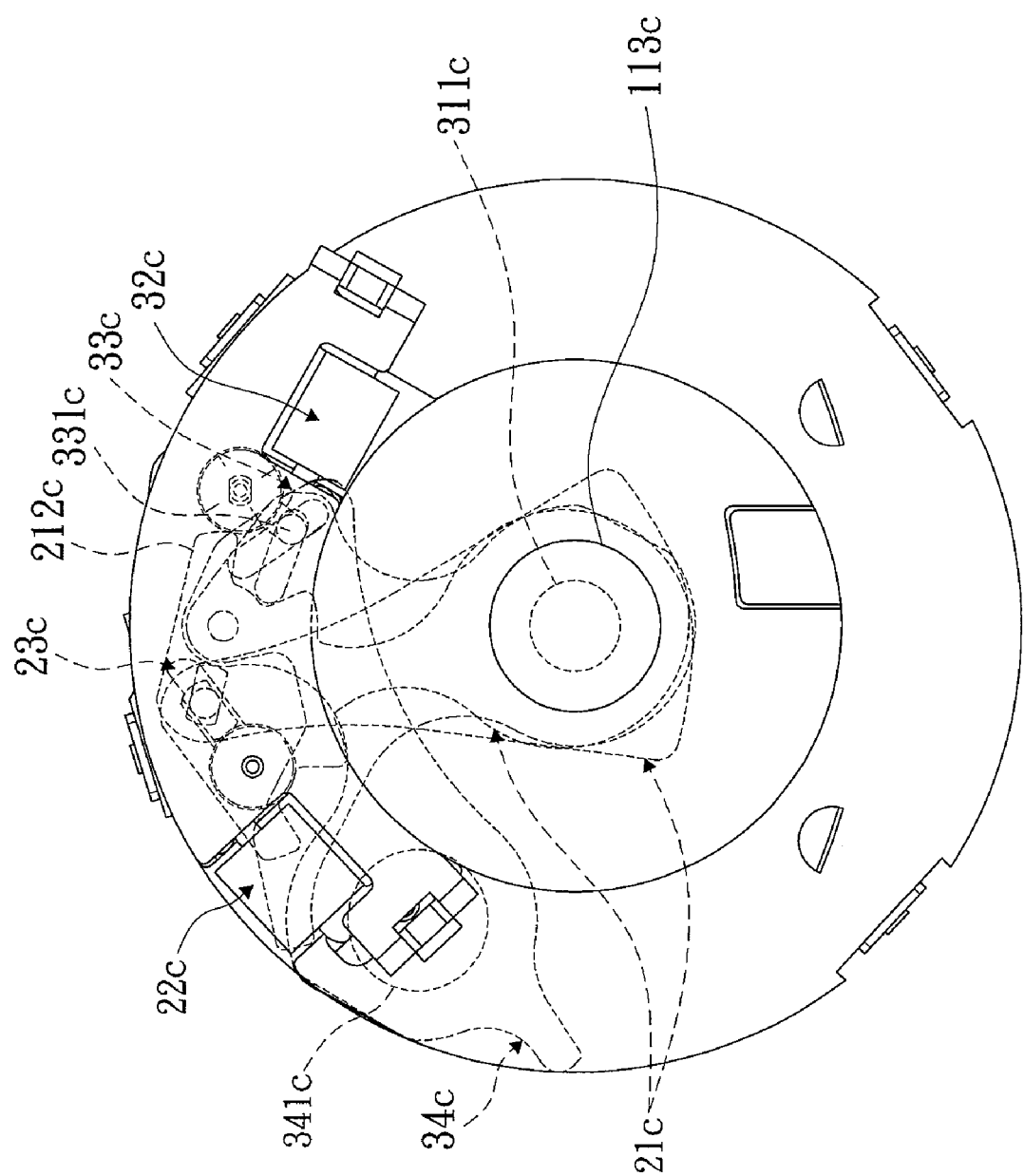
FIG. 18 is a top view showing the locations of the two shutter sheets, the first aperture plate, and the second aperture plate when the toggling element and the toggled element are respectively at a covering location and a first aperture location.
Figure 19:
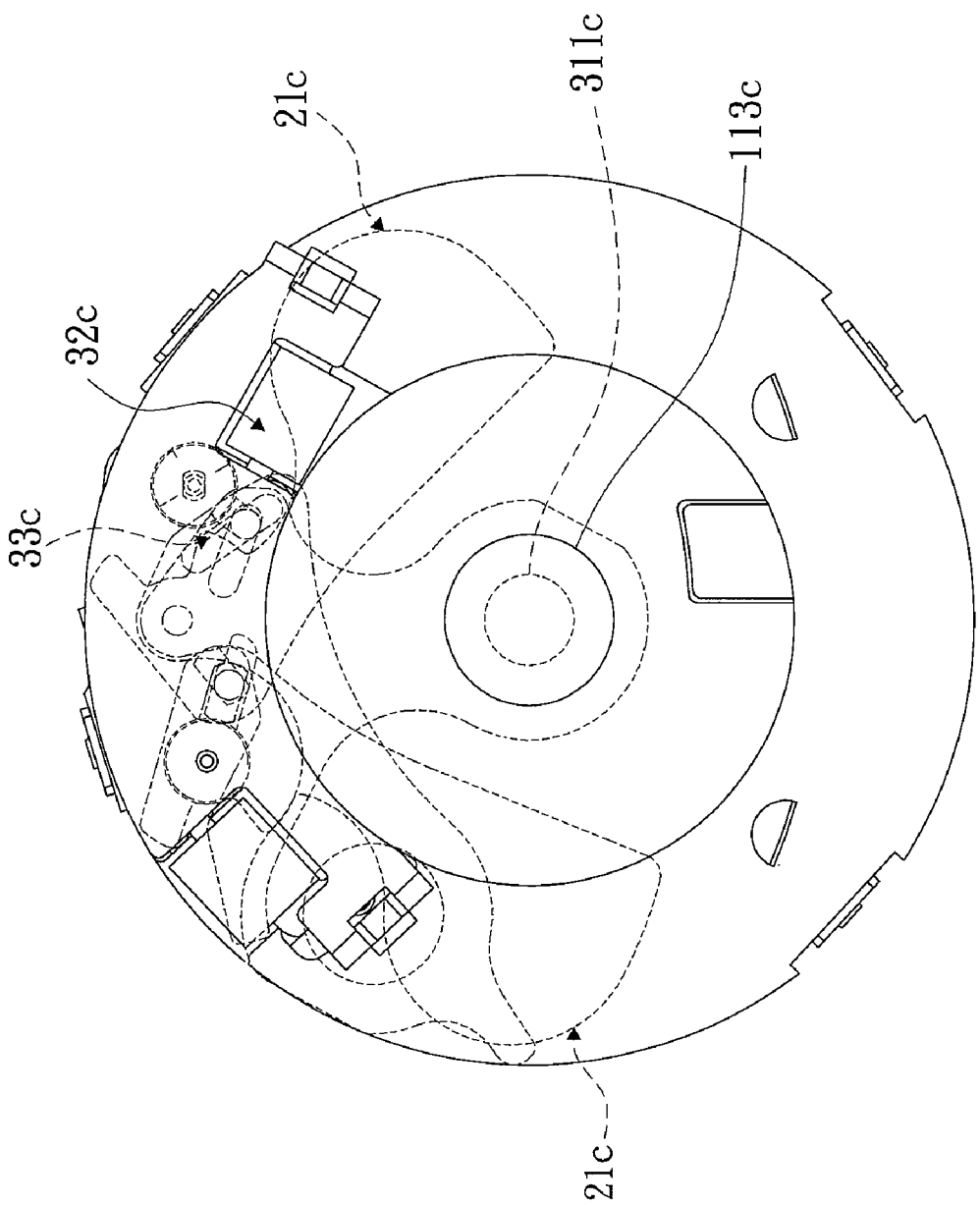
FIG. 19 is a top view showing the locations of the two shutter sheets, the first aperture plate, and the second aperture plate when the toggling element and the toggled element are respectively at the opening location and the first aperture location.

Referring to FIGS. 16, 18 and 19, if the light passing through the primary pressure/cover plate 13c along the optical axis Y3 is required to equal the light passing through the first aperture 311c of the first aperture plate 31c, the first aperture 311c of the first aperture plate 31b and the optical opening 113c of the base 11c must be in superposition (shown in FIG. 19). That is, the shutter-driving element 22c is actuated to switch the toggling element 23c to the covering location (shown in FIG. 18) (i.e., the shutter sheets 21c covers the optical opening 113c of the base 11c of the base unit 1c), the shutter-driving element 22c is actuated to switch the toggling element 23c to the opening location, thereby forcing the shutter sheet 21c apart from the optical opening 113c of the base 11c of the base unit 1c (shown in FIG. 19). Thus, the light passing through the primary pressure/cover plate 13c is equal to the light passing through the first aperture 311c of the first aperture plate 31c.

Figure 20:
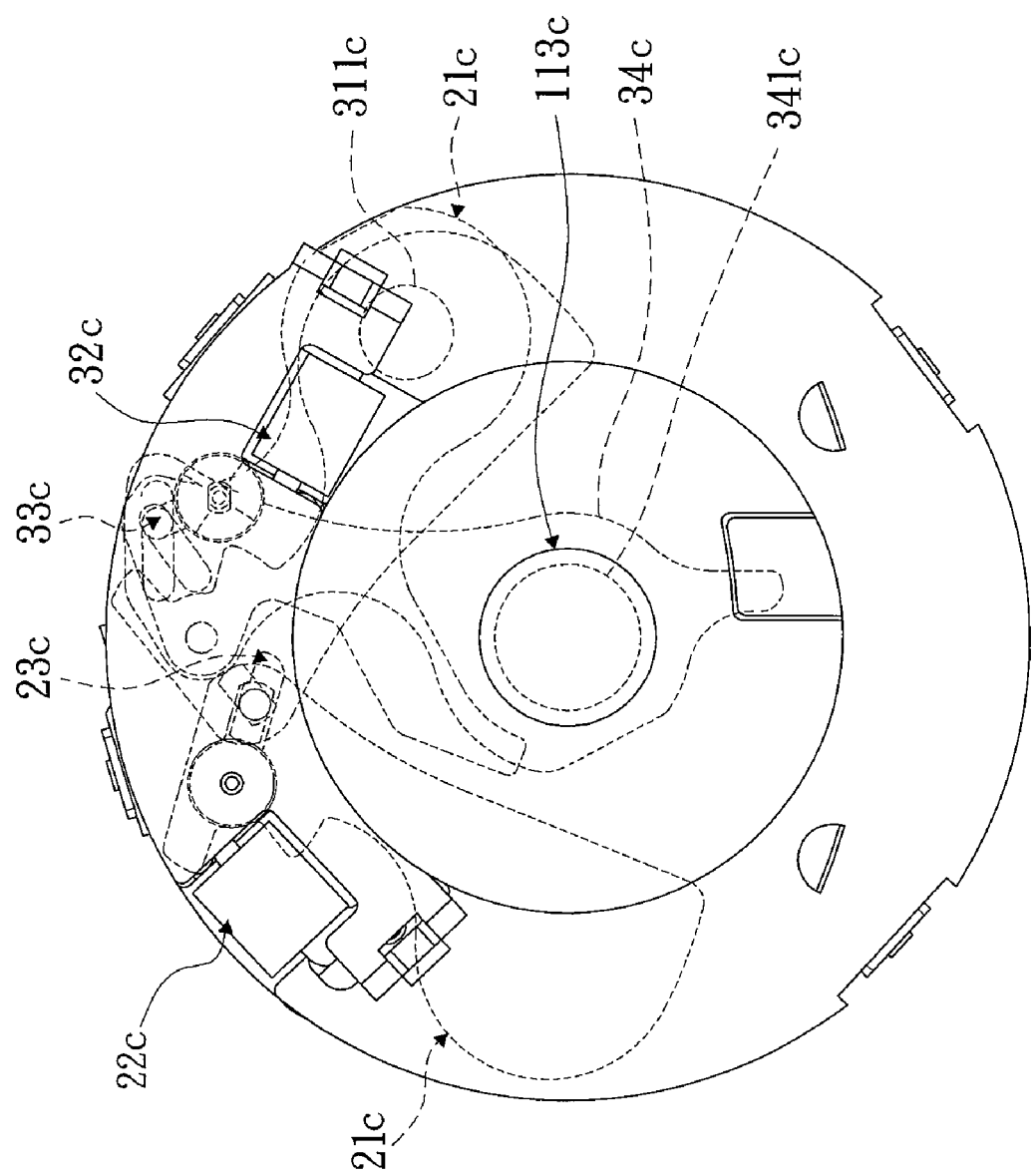
FIG. 20 is a top view showing the locations of the two shutter sheets, the first aperture plate, and the second aperture plate when the toggling element and the toggled element are respectively at the opening location and the second aperture location.
Figure 21:
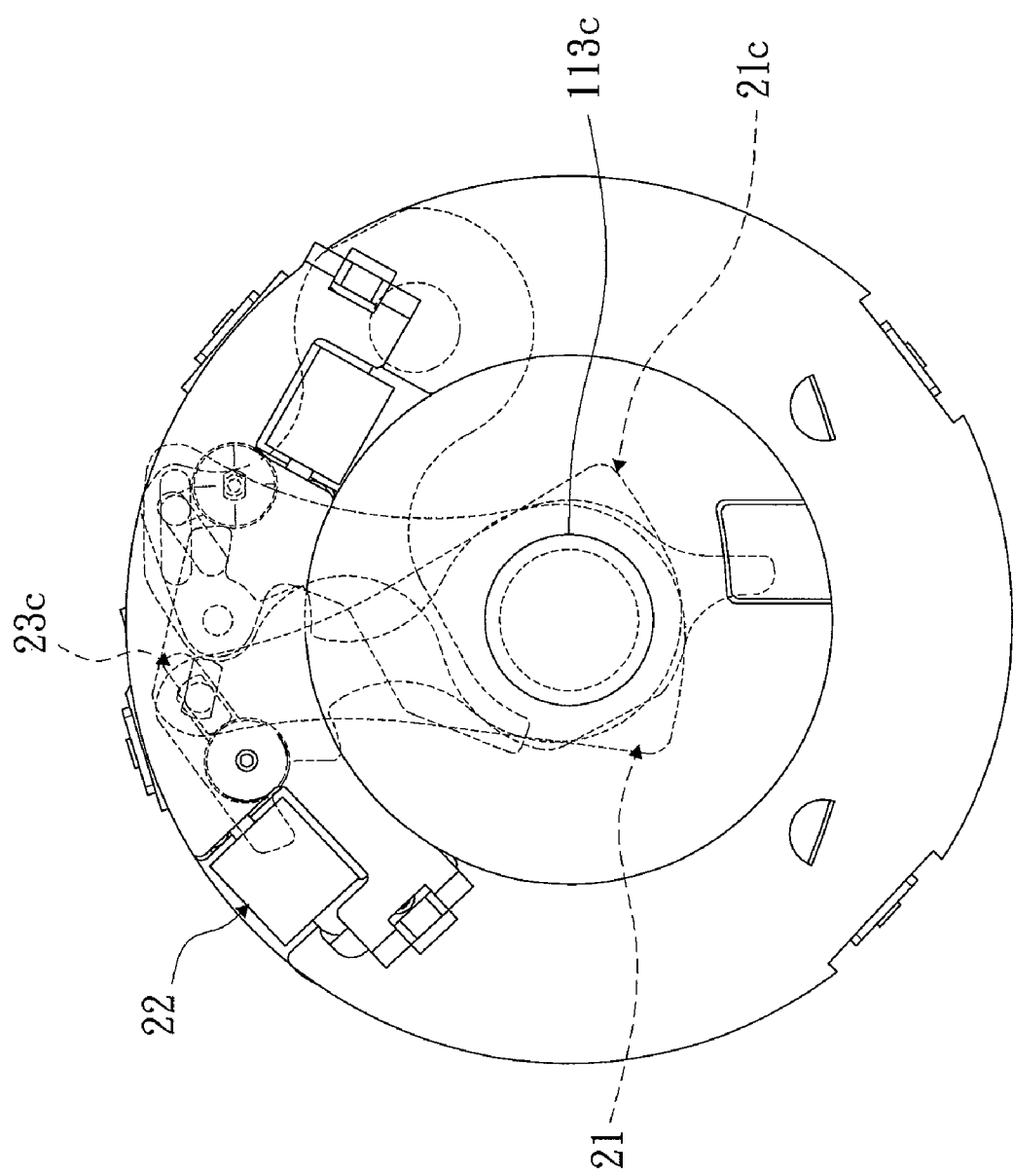
FIG. 21 is a top view showing the locations of the two shutter sheets, the first aperture plate, and the second aperture plate when the toggling element and the toggled element are respectively at the covering location and the second aperture location.

Referring to FIGS. 16, 17, 20 and 21, if the light passing through the primary pressure/cover plate 13c along the optical axis Y3 is required to equal the light passing through the second aperture 341c of the second aperture plate 34c of the diaphragm unit 3c' (i.e., when the second aperture 341c of the second aperture plate 34c of the diaphragm unit 3c' and the optical opening 113c of the base 11c are in superposition) and when the toggling element 23c and the toggled element 33c are respectively at the opening location and the large aperture location (shown in FIG. 17), the diaphragm-driving element 32c is actuated to switch the toggled element 33c to the second aperture location, thereby removing the first aperture 311a apart from the optical opening 113c of the optically perforated board 110 of the base 11c of the base unit 1c and causing the second aperture 341c of the second aperture plate 34c of the diaphragm unit 3c' and the optical opening 113c of the base 11c of the base unit 1c in superposition (shown in FIG. 20). Thus, the light passing through the primary pressure/cover plate 13c is equal to the light passing through the second aperture 341c of the second aperture plate 34c of the diaphragm unit 3c'. To cover the optical opening 113c of the base 11c of the base unit 1c by the shutter sheets 21c of the shutter unit 2c, the shutter-driving element 22c is actuated to switch the toggling element 23c to the covering location.

The aperture-ring-and-shutter device E4 of the fourth embodiment is capable of providing the same function as the aperture-ring-and-shutter device E3 of the third embodiment, wherein the diaphragm-driving element 32c is actuated to switch the toggled element 33c from the large aperture location to the second aperture location so that the second aperture 341c of the second aperture plate 34c and the optical opening 113c of the base 11c are in superposition. As compared to the prior art in which an increased number of aperture rings requires more driving elements, the aperture-ring-and-shutter device E4 of the fourth embodiment is capable of controlling the second aperture plate 34c without an increased number of the diaphragm-driving elements 32c. Therefore, the volume, the number of parts, and the manufacturing cost of the aperture-ring-and-shutter device can be reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An aperture-ring-and-shutter device, comprising:
a base unit, comprising a base comprising a first surface, a second surface opposing the first surface, and an optical opening penetrating through the first surface and the second surface along an optical axis;
a shutter unit, comprising at least one shutter sheet pivotally disposed on the base of the base unit, a shutter- driving element disposed on the base of the base unit, and a toggling element actuated by the shutter-driving element, wherein the toggling element has a guide bar utilized to rotate the at least one shutter sheet, and the shutter-driving element switches the toggling element between an opening location and a covering location, so that the guide bar of the toggling element forces the at least one shutter sheet to expose or cover the optical opening of the base unit; and a diaphragm unit, comprising a first aperture plate, a diaphragm-driving element disposed on the base of the base unit, and a toggled element pushed by the diaphragm-driving element, wherein the first aperture plate has a first aperture less than the optical opening of the base unit, and the toggled element has a guide pin utilized to rotate the first aperture plate, wherein the diaphragm-driving element drives the toggled element from a first aperture location to a large aperture location, and the guide pin of the toggled element rotates the first aperture plate, so that the first aperture of the first aperture plate and the optical opening of the base unit in superposition are switched to separate from each other; and wherein the toggled element of the diaphragm unit is switched to the first aperture location by the toggling element of the shutter unit when the toggled element of the diaphragm unit is located at the large aperture location and the toggling element of the shutter unit is switched from the opening location to the covering location, and wherein the shutter-driving element of the shutter unit comprises a first electromagnetic actuator and a first magnetic element pivoted on the base of the base unit and firmly connected to the toggling element of the shutter unit, the first magnetic element having a first axis is driven by the first electromagnetic actuator to rotate about the first axis, the diaphragm-driving element of the diaphragm unit comprises a second electromagnetic actuator and a second magnetic element pivoted on the base of the base unit and firmly connected to the toggled element, and the second magnetic element having a second axis is driven by the second electromagnetic actuator to rotate about the second axis.

2. The aperture-ring-and-shutter device as claimed in claim 1, wherein the base unit further comprises a large aperture plate disposed adjacent to the second surface of the base, the large aperture plate has a large aperture greater than the first aperture of the first aperture plate and less than the optical opening of the base unit, the large aperture of the large aperture plate and the optical opening of the base unit are in superposition, the at least one shutter sheet is disposed between the base of the base unit and the large aperture plate, and the shutter-driving element and the diaphragm-driving element are disposed adjacent to the first surface.

3. The aperture-ring-and-shutter device as claimed in claim 2, wherein the base unit further comprises a primary pressure/cover plate and a secondary pressure/cover plate, wherein the primary pressure/cover plate is fastened to the base so that the at least one shutter sheet, the large aperture plate, and the first aperture plate are connected to the base of the base unit, the secondary pressure/cover plate is fastened to the base so that the shutter-driving element, the diaphragm-driving element, the toggling element, and the toggled element are connected to the base of the base unit, and the first aperture plate is disposed between the large aperture plate and the primary pressure/cover plate.

4. The aperture-ring-and-shutter device as claimed in claim 3, wherein the shutter unit comprises two shutter sheets away from the large aperture of the large aperture plate, and the guide bar of the toggling element moves the shutter sheets close to each other to cover the large aperture of the large aperture plate when the toggling element is switched from the opening location to the covering location.

5. The aperture-ring-and-shutter device as claimed in claim 4, wherein the base of the base unit further comprises two curved slots penetrating through the first surface and the second surface along the optical axis, each of the shutter sheets and the first aperture plate have an elongated hole, the guide bar of the toggling element passes through one of the curved slots of the base of the base unit and the elongated holes of the shutter sheets, and the guide pin of the toggled element passes through the other curved slot of the base of the base unit and the elongated hole of the first aperture plate.

6. The aperture-ring-and-shutter device as claimed in claim 5, wherein the first and second magnetic elements of the shutter unit and the diaphragm unit are two-pole magnets.

7. The aperture-ring-and-shutter device as claimed in claim 3, wherein the diaphragm unit further comprises a second aperture plate pivotally disposed between the large aperture plate and the primary pressure/cover plate and moved by the guide pin of the toggled element, and the second aperture plate has a second aperture greater than the first aperture of the first aperture plate and less than the large aperture of the large aperture plate, wherein the toggled element is switched by the diaphragm-driving element from a second aperture location to the large aperture location and the guide pin of the toggled element rotates the second aperture plate, so that the second aperture and the optical opening of the base unit in superposition are switched to separate from each other, and the toggled element is switched to the second aperture location by the toggling element when the toggled element is located at the large aperture location and the toggling element is switched from the covering location to the opening location.

8. The aperture-ring-and-shutter device as claimed in claim 7, wherein the shutter unit comprises two shutter sheets away from the large aperture of the large aperture plate, and the guide bar of the toggling element moves the shutter sheets close to each other to cover the large aperture of the large aperture plate when the toggling element is switched from the opening location to the covering location.

9. The aperture-ring-and-shutter device as claimed in claim 8, wherein the base of the base unit further comprises two curved slots penetrating through the first surface and the second surface along the optical axis, each of the shutter sheets and the first aperture plate have an elongated hole, the guide bar of the toggling element passes through one of the curved slots of the base of the base unit and the elongated holes of the shutter sheets, and the guide pin of the toggled element passes through the other curved slot of the base of the base unit and the elongated hole of the first aperture plate.

10. The aperture-ring-and-shutter device as claimed in claim 9, wherein the first magnetic element of the shutter-driving element of the shutter unit comprises a magnet, and the second magnetic element of the diaphragm unit comprises a four-pole magnet.

11. An aperture-ring-and-shutter device, comprising:
a base unit, comprising a base comprising a first surface, a second surface opposing the first surface, and an optical opening penetrating through the first surface and the second surface along an optical axis;
a shutter unit, comprising at least one shutter sheet pivotally disposed on the base of the base unit, a shutter-driving element disposed on the base of the base unit, and a toggling element actuated by the shutter-driving element,
wherein the at least one shutter sheet comprises an arm, the toggling element has a guide bar utilized to rotate the at least one shutter sheet, and the shutter-driving element switches the toggling element between an opening location and a covering location, so that the guide bar of the toggling element forces the at least one shutter sheet to expose or cover the optical opening of the base unit; and a diaphragm unit, comprising a first aperture plate, a diaphragm-driving element disposed on the base of the base unit, and a toggled element pushed by the diaphragm-driving element, wherein the first aperture plate has a first aperture less than the optical opening of the base unit, and the toggled element has a guide pin utilized to rotate the first aperture plate, wherein the diaphragm-driving element drives the toggled element from a first aperture location to a large aperture location, and the guide pin of the toggled element rotates the first aperture plate, so that the first aperture of the first aperture plate and the optical opening of the base unit in superposition are switched to separate from each other, and wherein the toggled element is switched to the first aperture location by the arm of the at least one shutter sheet when the toggled element is located at the large aperture location and the toggling element is switched from the opening location to the covering location, and wherein the shutter-driving element of the shutter unit comprises a first electromagnetic actuator and a first magnetic element pivoted on the base of the base unit and firmly connected to the toggling element of the shutter unit, the first magnetic element having a first axis is driven by the first electromagnetic actuator to rotate about the first axis, the diaphragm-driving element of the diaphragm unit comprises a second electromagnetic actuator and a second magnetic element pivoted on the base of the base unit and firmly connected to the toggled element, and the second magnetic element having a second axis is driven by the second electromagnetic actuator to rotate about the second axis.

12. The aperture-ring-and-shutter device as claimed in claim 11, wherein the base unit further comprises a large aperture plate disposed adjacent to the second surface of the base, the large aperture plate has a large aperture greater than the first aperture of the first aperture plate and less than the optical opening of the base unit, the large aperture of the large aperture plate and the optical opening of the base unit are in superposition, the at least one shutter sheet is disposed between the base of the base unit and the large aperture plate, and the shutter-driving element and the diaphragm-driving element are disposed adjacent to the first surface.

13. The aperture-ring-and-shutter device as claimed in claim 12, wherein the base of the base unit further comprises a base body and an optically perforated board connected to the base body, the first magnetic element of the shutter-driving element of the shutter unit and the second magnetic element of the diaphragm-driving element of the diaphragm unit are disposed on the base body of the base of the base unit, and the optically perforated board is provided with the first surface, the second surface and the optical opening.

14. The aperture-ring-and-shutter device as claimed in claim 13, wherein the base unit further comprises a primary pressure/cover plate and a secondary pressure/cover plate, wherein the primary pressure/cover plate is fastened to the base body of the base of the base unit so that the at least one shutter sheet, the optically perforated board, the large aperture plate, and the first aperture plate are connected to the base body of the base of the base unit, the secondary pressure/cover plate is fastened to the base so that the shutter-driving element, the diaphragm-driving element, the toggling element, and the toggled element are connected to the base body of the base of the base unit, and the first aperture plate is disposed between the large aperture plate and the primary pressure/cover plate.

15. The aperture-ring-and-shutter device as claimed in claim 14, wherein the shutter unit comprises two shutter sheets away from the large aperture of the large aperture plate, the guide bar of the toggling element moves the shutter sheets close to each other to cover the large aperture of the large aperture plate when the toggling element is switched from the opening location to the covering location, and the toggled element of the diaphragm unit is switched to the first aperture location by the arm of the one of the shutter sheet of the shutter unit.

16. The aperture-ring-and-shutter device as claimed in claim 15, wherein the base of the base unit further comprises two curved slots penetrating through the base body along the optical axis, each of the shutter sheets and the first aperture plate have an elongated hole, the guide bar of the toggling element passes through one of the curved slots of the base of the base unit and the elongated holes of the shutter sheets, and the guide pin of the toggled element passes through the other curved slot of the base of the base unit and the elongated hole of the first aperture plate.

17. The aperture-ring-and-shutter device as claimed in claim 16, wherein the first and second magnetic elements of the shutter unit and the diaphragm unit are two-pole magnets.

18. The aperture-ring-and-shutter device as claimed in claim 14, wherein the diaphragm unit further comprises a second aperture plate pivotally disposed between the large aperture plate and the primary pressure/cover plate and moved by the guide pin of the toggled element, and the second aperture plate has a second aperture greater than the first aperture of the first aperture plate and less than the large aperture of the large aperture plate, wherein the toggled element is switched by the diaphragm-driving element from a second aperture location to the large aperture location and the guide pin of the toggled element rotates the second aperture plate, so that the second aperture is switched between a status where the second aperture and the optical opening of the optically perforated board of the base unit are disposed in superposition and another status where the second aperture and the optical opening of the optically perforated board of the base unit are separated.

19. The aperture-ring-and-shutter device as claimed in claim 18, wherein the shutter unit comprises two shutter sheets away from the large aperture of the large aperture plate, the guide bar of the toggling element moves the shutter sheets close to each other to cover the large aperture of the large aperture plate when the toggling element is switched from the opening location to the covering location, and the toggled element of the diaphragm unit is switched to the first aperture location by the arm of the one of the shutter sheet of the shutter unit.

20. The aperture-ring-and-shutter device as claimed in claim 19, wherein the base of the base unit further comprises two curved slots penetrating through the base body along the optical axis, each of the shutter sheets and the first aperture plate have an elongated hole, the guide bar of the toggling element passes through one of the curved slots of the base of the base unit and the elongated holes of the shutter sheets, and the guide pin of the toggled element passes through the other curved slot of the base of the base unit and the elongated holes of the first and second aperture plates.

21. The aperture-ring-and-shutter device as claimed in claim 20, wherein the first magnetic element of the shutter-driving element of the shutter unit comprises a magnet, and the second magnetic element of the diaphragm unit comprises a four-pole magnet.

* * * * *